United States Patent
Luu et al.

(10) Patent No.: US 8,042,139 B2
(45) Date of Patent: Oct. 18, 2011

(54) METHOD FOR CONFIGURING BROADCAST COMPONENTS OF A BROADCAST SYSTEM INCLUDING A COMPRESSION CONTROL SYSTEM

(75) Inventors: Trang V Luu, Rancho Palos Verdes, CA (US); Mark T Takamoto, Pacoima, CA (US); Gilbert Zaldivar, Rancho Santa Margarita, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 328 days.

(21) Appl. No.: 12/042,265

(22) Filed: Mar. 4, 2008

(65) Prior Publication Data

US 2009/0228925 A1    Sep. 10, 2009

(51) Int. Cl.
*H04N 7/20* (2006.01)
*H04N 7/173* (2011.01)

(52) U.S. Cl. .............. 725/93; 725/70; 725/71; 725/114

(58) Field of Classification Search ................. 386/124; 370/398; 725/62, 63, 70, 71, 91–93, 114
See application file for complete search history.

(56) References Cited

U.S. PATENT DOCUMENTS

| | | | |
|---|---|---|---|
| 5,585,838 A | 12/1996 | Lawler et al. | |
| 5,600,573 A | 2/1997 | Hendricks et al. | |
| 5,666,645 A | 9/1997 | Thomas et al. | |
| 6,404,769 B1 * | 6/2002 | Kapoor | 370/398 |
| 6,654,957 B1 * | 11/2003 | Moore et al. | 725/111 |
| 6,728,269 B1 | 4/2004 | Godwin et al. | |
| 6,947,388 B1 | 9/2005 | Wagner | |
| 7,207,055 B1 | 4/2007 | Hendricks et al. | |
| 7,308,697 B1 | 12/2007 | Jerding et al. | |
| 2001/0036198 A1 | 11/2001 | Arsenault et al. | |
| 2002/0066102 A1 | 5/2002 | Chapman et al. | |
| 2002/0118638 A1 | 8/2002 | Donahue et al. | |
| 2002/0154623 A1 | 10/2002 | Hundemer | |
| 2003/0067554 A1 | 4/2003 | Klarfeld et al. | |
| 2003/0081587 A1 | 5/2003 | Ichiyoshi | |
| 2003/0217362 A1 | 11/2003 | Summers et al. | |
| 2004/0226045 A1 | 11/2004 | Nadarajah | |
| 2005/0039205 A1 | 2/2005 | Riedl | |
| 2006/0248556 A1 | 11/2006 | Yuen et al. | |
| 2008/0222689 A1 | 9/2008 | Howcroft et al. | |
| 2009/0052863 A1 * | 2/2009 | Parmar et al. | 386/83 |
| 2009/0052870 A1 * | 2/2009 | Marsh et al. | 386/124 |
| 2009/0193486 A1 * | 7/2009 | Patel et al. | 725/114 |
| 2010/0023972 A1 | 1/2010 | Summers et al. | |

FOREIGN PATENT DOCUMENTS

| | | |
|---|---|---|
| WO | 00/60784 | 10/2000 |
| WO | 03/058967 | 7/2003 |
| WO | 2006/113404 | 10/2006 |

* cited by examiner

*Primary Examiner* — Kieu Oanh Bui

(57) ABSTRACT

A method and system for configuring broadcast components includes a broadcast operation channel management system (BMS) forming a bit rate allocation chart and a compression control system storing a stream map having a channel lineup. The BMS retrieves the channel line up from the compression control system and modifying the channel lineup to form a modified channel line up. The BMS communicates the modified channel lineup to the compression control system.

15 Claims, 26 Drawing Sheets

METHOD FOR CONFIGURING BROADCAST COMPONENTS OF A BROADCAST SYSTEM INCLUDING A COMPRESSION CONTROL SYSTEM

TECHNICAL FIELD

The present disclosure relates generally to a satellite communication system, and, more specifically, to a system and method for configuring a compression control system and associated components from allocation data BACKGROUND.

The statements in this section merely provide background information related to the present disclosure and may not constitute prior art.

Satellite television is increasing in popularity due to the ever-increasing amount of programming as well as the quality of programming.

Satellite television broadcast systems typically use several satellites. Each satellite has several transponders that receive signals from the ground and broadcast the signals to users. Each transponder is capable of providing a certain amount of content therethrough. That is, each transponder may provide a certain bit rate therethrough.

As the channels change from different levels or quality of content, such as high definition versus standard definition, the bit rates may change. Also, satellite programming provides occasional programming or channels that are not constantly broadcast. Pay-per-view content and sporting events are examples of occasional content that is provided.

At DIRECTV®, which is the largest provider of satellite television programming in the United States, the engineering department is responsible for generating a bit rate allocation chart to manage the bandwidth of the various transponders. Currently, channel mapping and data entry are performed manually into a spreadsheet. The spreadsheet is known as a bit rate allocation chart (BRAC). Once the BRAC is formed, the information is managed, shared and distributed to the various functions that are responsible for managing and maintaining the on-air broadcast. A manual procedure is followed to set-up, configure and/or modify the affected broadcast systems, including configuring the broadcast equipment, entering the channel mapping information into the traffic and scheduling system and setting up the program guide configurations. If any portion of the manual procedure is overlooked or channel data is incorrectly entered, various negative impacts on the broadcast, such as channel outages and incorrect content, may be performed. Typically, the BRAC may be changed several times and thus there are various opportunities for mis-entering or not configuring certain equipment with the latest configurations. As a result, customer satisfaction may be reduced when such errors occur.

SUMMARY

The present disclosure provides a centralized and automated system that may be used to configure a compression control system which in turn may configure other components.

In one aspect of the disclosure, a method includes forming a bit rate allocation chart at a broadcast operation channel management system (BMS), storing a stream map having a channel lineup in a compression control system, retrieving the channel line up from the compression control system at the broadcast operation channel management system, modifying the channel lineup at BMS to form a modified channel line up, and communicating the modified channel lineup from the BMS to the compression control system.

In a further aspect of the disclosure, a system includes a broadcast operation channel management system (BMS) forming a bit rate allocation chart and a compression control system storing a stream map having a channel lineup. The BMS retrieves the channel line up from the compression control system and modifying the channel lineup to form a modified channel line up. The BMS communicates the modified channel lineup to the compression control system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
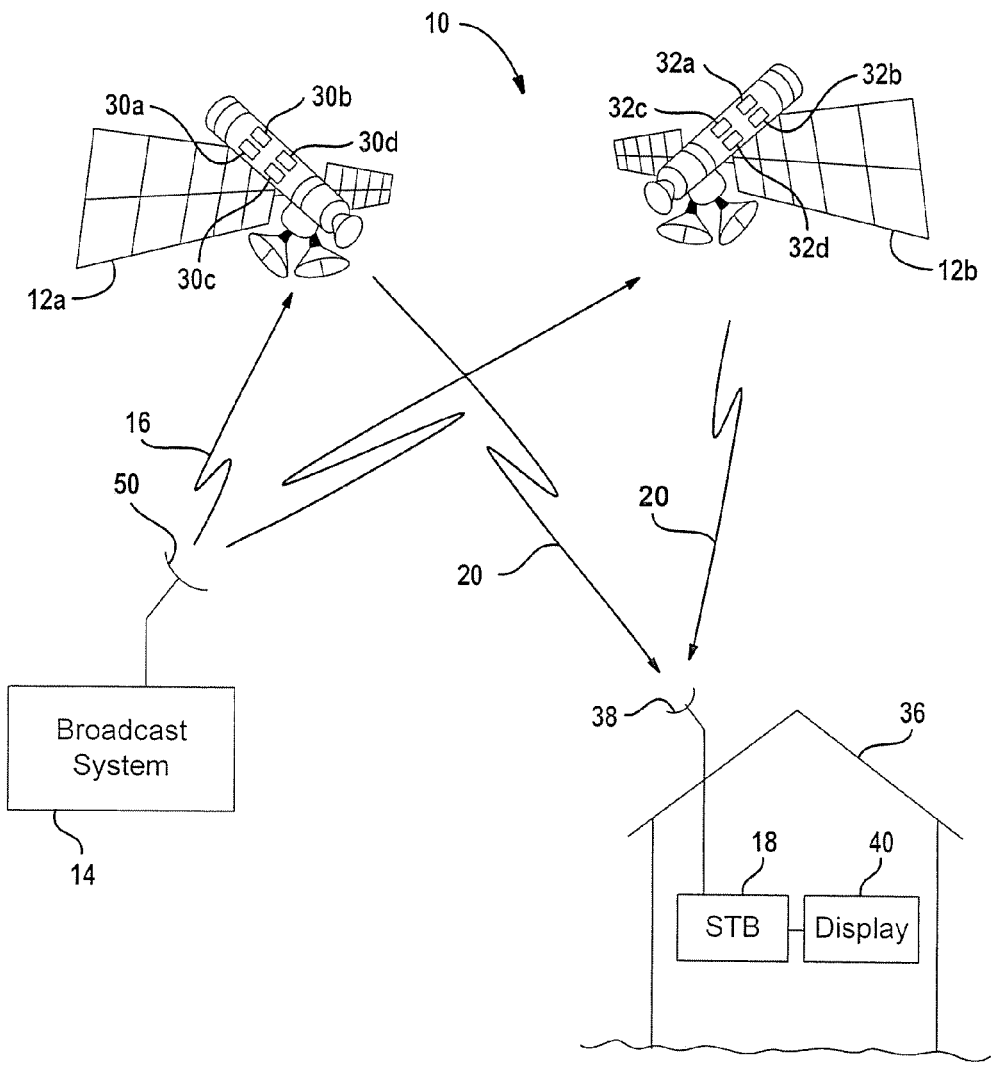
FIG. 1 is a system level view of the communication system according to the present disclosure.
Figure 1:
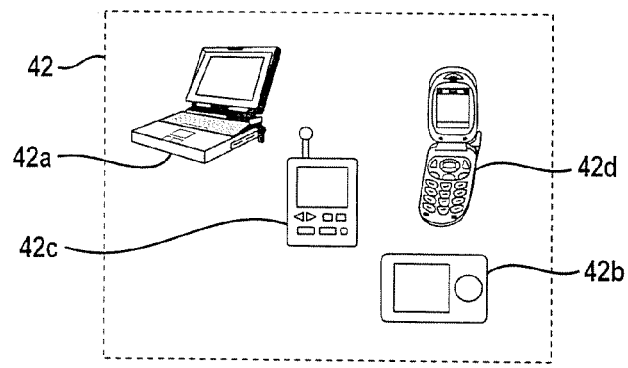

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. However, the present invention may also be suitable for other types of communication systems including non-satellite and data communications.

Referring now to FIG. 1, a satellite communication system 10 is illustrated having a first satellite 12a and a second satellite 12b. The communication system 10 may be a satellite television system or data distribution system.

The system 10 may include a broadcast system 14 for generating uplink signal 16 to the satellites 12a and 12b. The signals may correspond to various channel streams or multiplex channel streams that are communicated from the satellites 12a, 12b to a fixed user device 18 through downlinks 20. Only one user device 18 is illustrated by way of example. However, a system 10 may include several user devices.

Satellite 12a may include a plurality of transponders of which four are illustrated as reference numerals 30a-30d. The satellite 12b may also include a plurality of transponders including transponders 32a-32d. The transponders 30a-30d and 32a-32d receive the uplink signals from the broadcast system 14 and direct the signal, such as television signals, through the downlinks 20 to various users. The downlink signals 20 may be Continental United States (CONUS) or may be spot beam signals. As will be further described below, various allocations of channel signals to the various transponders may be provided. Transponders 30a, 30b, 32a and 32b are uplink transponders. Transponders 30c, 30d, 32c and 32d are downlink transponders. Although only four are illustrated, several different uplink transponders and downlink transponders may be provided in each satellite.

The user device 18 may comprise a set top box (STB) disposed within a home or business 36. An antenna 38 is used to receive the downlink signals 20 and provide them to the user receiving device 18. The user receiving device 18 may be in communication with a display 40 for displaying the channel signals.

Another type of user device may also be included in the system, a mobile receiving device 42. A plurality of mobile receiving devices is illustrated in box 42. A portable computer 42a, a portable media player 42b, a personal digital assistant 42c and a cellular telephone 42d are illustrated. Each of the devices includes an antenna that may be integral therewith for receiving the downlink signals 20. Different types and numbers of mobile devices may also be included in the system. It should be noted that both fixed and mobile user devices may be included. Of course, either fixed or mobile alone may be used in a system.

The broadcast system 14 includes an antenna 50 for uplinking uplink signal 16 to satellites 12a and 12b. Although only one antenna 50 is illustrated for simplicity purposes, more than one antenna may be used.

Figure 2:
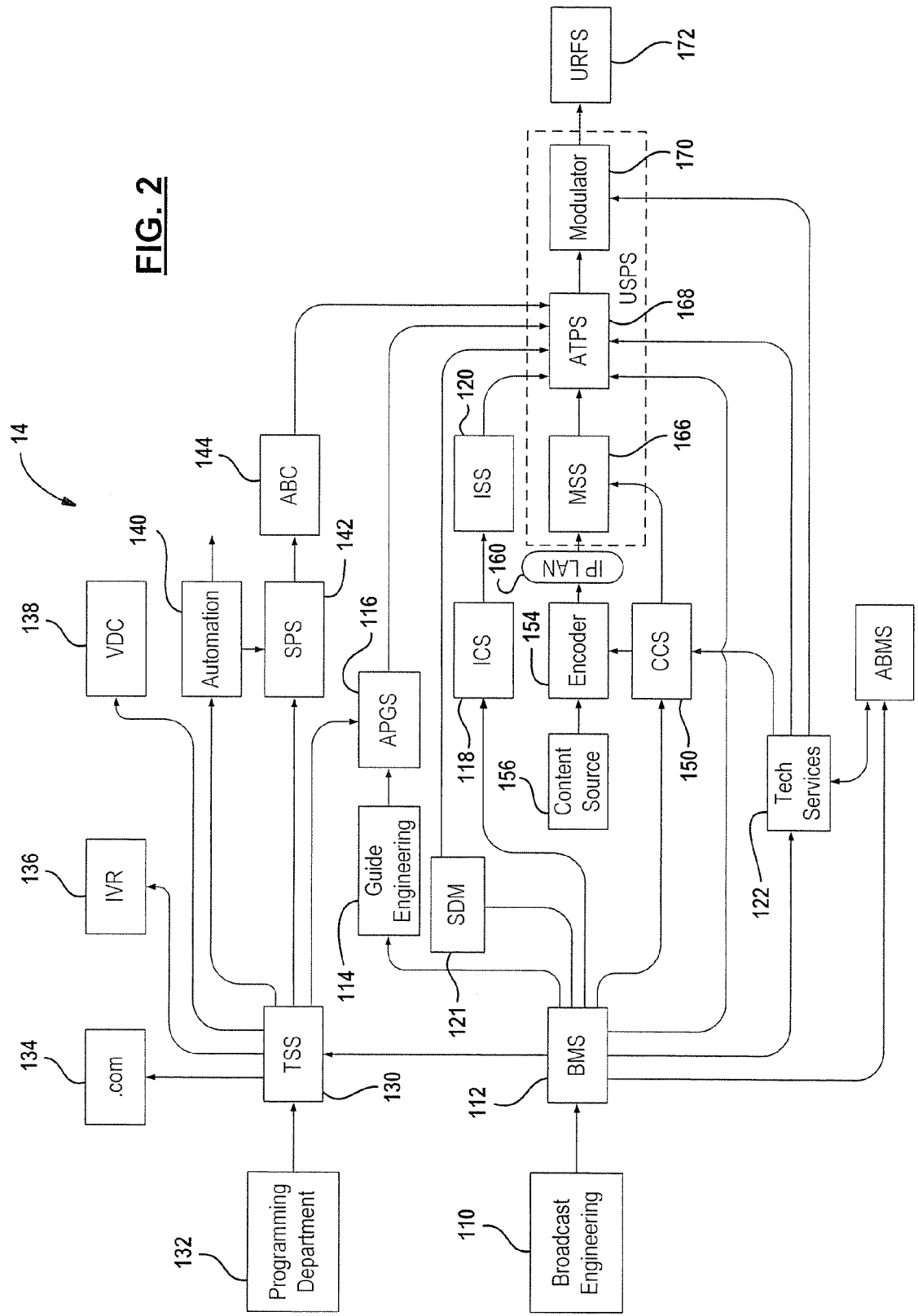
FIG. 2 is a block diagrammatic view of the broadcast system 14 of FIG. 1.

Referring now to FIG. 2, a block diagrammatic view of the broadcast system 14 of FIG. 1 is illustrated in further detail. The broadcast system 14 includes a broadcast engineering module 110 that is used for providing various inputs to a broadcast operation channel management system (BMS) 112. The BMS system 112 is used to allocate the resources of the satellites 12a and 12b illustrated in FIG. 1. Each transponder in the satellites is capable of providing various throughput which is referred to as a bit rate. The BMS system 112 provides a centralized and automated system to manage and maintain the information for a bit rate allocation chart in a database and communicates various data to various components of the broadcast system 14.

The BMS 112 may provide boot packet identifiers (PIDs) and rates to a guide engineering module 114. Guide engineering 114 may receive the data in various formats including email. Guide engineering 114, in turn, uses the information received to form the program guide in the advanced program guide system 116.

The BMS 112 may also be used to provide channel and program identifier assignments to an interactive content scheduler (ICS) 118. The ICS 118 may provide various data to an interactive streaming server 120.

The BMS 112 may also be in communication with a software download manager (SDM) 121. The BMS 112 may interface with the SDM 121 and the ICS 118 using an XML-based web service. The BMS 112 may provide iTV channel, data PID assignments and rates via XML to the ICS 118. The SDM 121 may receive SWDL channel, data PID assignments and rates from the BMS 112.

The BMS 112 may also be in communication with a technical services module 122. The technical services module 122 may receive various bit rate allocation chart information. Bit rate allocation chart information may also be provided from the BMS 112 to an advanced broadcasting monitoring system 124. The advanced broadcasting monitoring system 124 may be used to monitor the quality of signals throughout various portions of the broadcasting system 14.

The BMS 112 may also provide channel definition and mapping data to a traffic and scheduling system 130. The traffic scheduling system 130 may receive a program schedule from a programming department 132. The traffic and scheduling system 130 may generate schedules to a dot corn module 134 used for ordering various content through an external computer interface. The data from the traffic and scheduling system 130 may also be provided to an interactive voice recognition (IVR) system 136 that also may be used to order various content.

The traffic and scheduling system 130 may also provide information to a VDC system 138.

The traffic and scheduling system 130 may also provide scheduling information to an automation system 140. The automation system and the traffic and scheduling 130 may be in communication with a scheduled pad server 142. The scheduled pad server 142 may receive program-associated data (PAD). The scheduled pad server 142 delivers program-associated data to an advance broadcast controller 144.

The BMS 112 may provide compression control system configuration data to a compression control system 150. The compression control system 150 may provide data to an encoder 154. The compression control system 150 may provide the data to the encoder 154 for configuring the encoder 154. The encoder 154 may receive content from a content source 156. The content source 156 may various live content sources provided from satellite or fiber. The content sources may also be based on file or tape-based content received from a content repository. The encoder 154 may be used to encode the various content from the content source 156 according to the configuration provided from the compression control system 150. The encoder 154 may communicate the encoded signals through a local area network such as an Internet protocol local area network 160. Of course, various numbers of encoders 154 may be provided.

The output of the encoders may be referred to as a single program transport stream (SPTS). The local area network 160 may include a plurality of routers or the like to route the single transport streams to one of a plurality of uplink signal processing systems 164. Each uplink signal processing system may correspond to the output of a single transponder within one of the satellites 12a, 12b.

The uplink signal processing system 164 may include a multiplexing splicing system 166, an advanced transport processing system 168 and a modulator 170. Although not shown, multiple components within the uplink signal processing system may have redundant systems.

The advance transport processing system 168 may receive various data signals from the advance broadcast controller 144, the advance program guide system 116, the interactive streaming server 120, the BMS 112 and technical services 122. The multiplexing splicing system (MSS) 166 may also receive configuration information from the compression control system 150. The compression control system 150 may generate configurations so that the multiplexing splicing system 166 receives the desired single-program transport streams through the LAN 160.

The tech services module 122 may also be in communication with the modulator 170 to provide configuration and feedback for the modulator 170.

The output of the modulator is in communication with an uplink RF system (URFS) 172. The uplink RF system 172 generates the uplink signal 16 as illustrated in FIG. 1. The uplink RF system may include the antenna 50 of FIG. 1.

It should be noted that various configurations of the block diagrammatic view illustrated above, may be provided. For example, should the output of the encoder 154 not be IP ready, the IP LAN 160 may be removed and a direct connection between an encoder and the multiplexing splicing system 166 may be provided. Further, the advance broadcast monitoring system 124 may also be eliminated.

Figure 3:
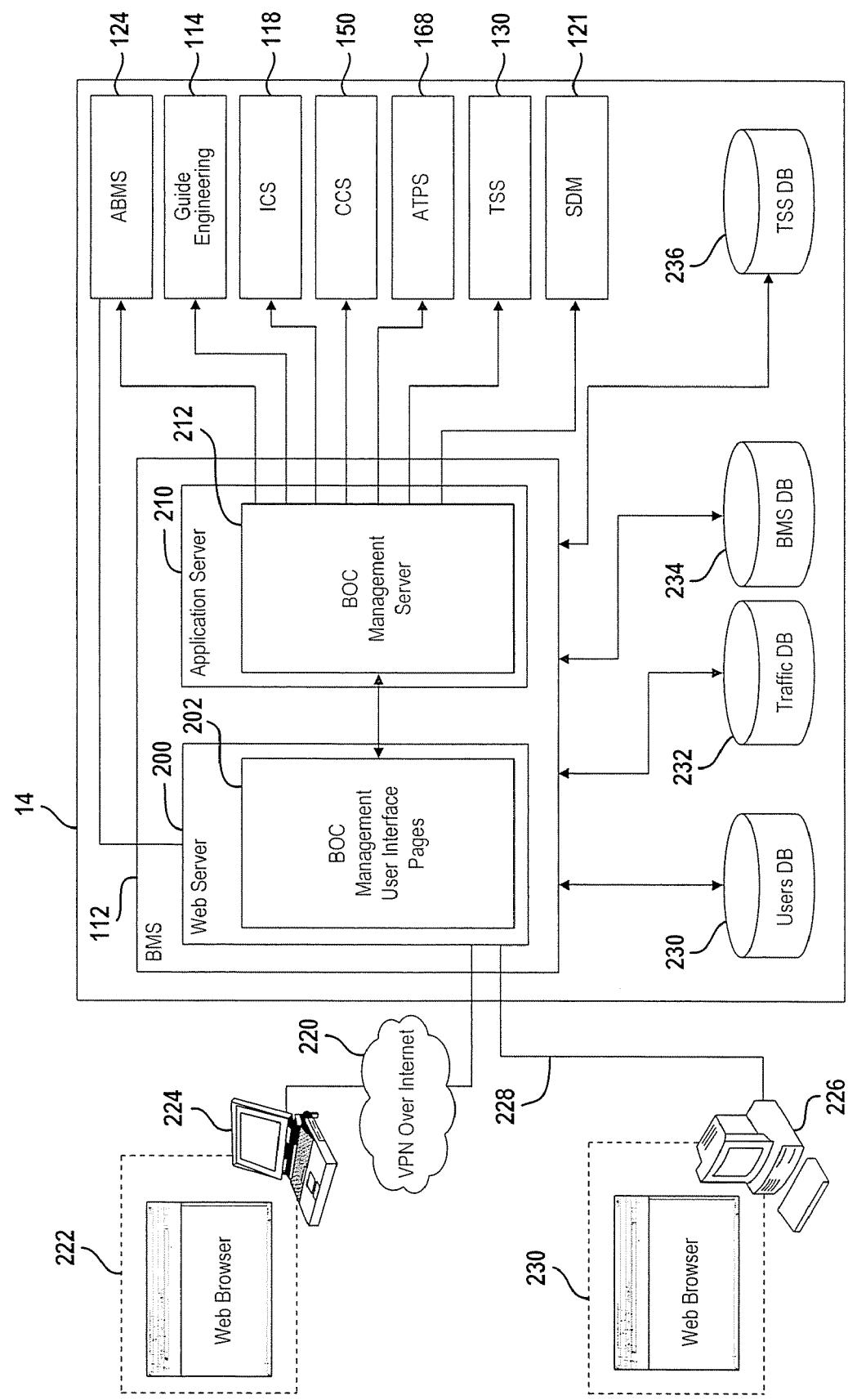
FIG. 3 is a more detailed block diagrammatic view of the broadcast system of FIG. 1.

Referring now to FIG. 3, the broadcast system 14 is illustrated in further detail with the broadcast operation channel management system 112 also illustrated in further detail.

The BMS may include a web server 200 that is used to provide broadcast operation channel management pages 202. The BMS 112 may also include an application server 210 for providing various information to other broadcast components within the broadcast system 14. For example, the management server 210 may be in communication with the advance broadcast monitoring system 124 through XML HTTP or TCP/IP. The broadcast operation channel management server 212 may be in communication with guide engineering 114 through an email or other types of communication. The ICS system 118 may receive channels and program identifiers assignments through XML HTTP. File copies may also be provided to the transport processing system 168 which may be in various formats. As will be further described below, each of the broadcast system components may receive broadcast operation channel data in various formats and may also receive different data depending on the system.

The web server 200 may issue various management or user interface pages 202 over the Internet 220 or other communication network. A user interface 222 may be generated on a computer 224 through which the changing of various data may be provided. It should be noted that the computer 224 may represent a home computer, or other system, of a supervisor who is responsible for maintaining the system. The network 220 may be a virtual private network over the Internet 220.

A computer 226 in communication with the web server 200 may also be provided information through a network 228. The network may be an internal LAN or the like and may be located in an office environment that includes the broadcast system 14. Again, a user interface 230 may be used to interface with and change various data within the broadcast system. As will be noted below, a secure login may be provided for users of the computer 224 and 226.

The BMS system 112 may be in communication with a user database 230, a traffic database 232, a BMS database 234 and a traffic and scheduling system database 236. The user database may include various information about users of the system. The BMS database may include various bit rate allocation charts including a security status of each user. The traffic database may include information about various channels, whereas the BMS database may include the bit rate allocation chart data. The traffic and scheduling database 236 may include various traffic scheduling data for the broadcast system. The contents and interaction of the various databases will be evident as set forth below.

Figure 4:
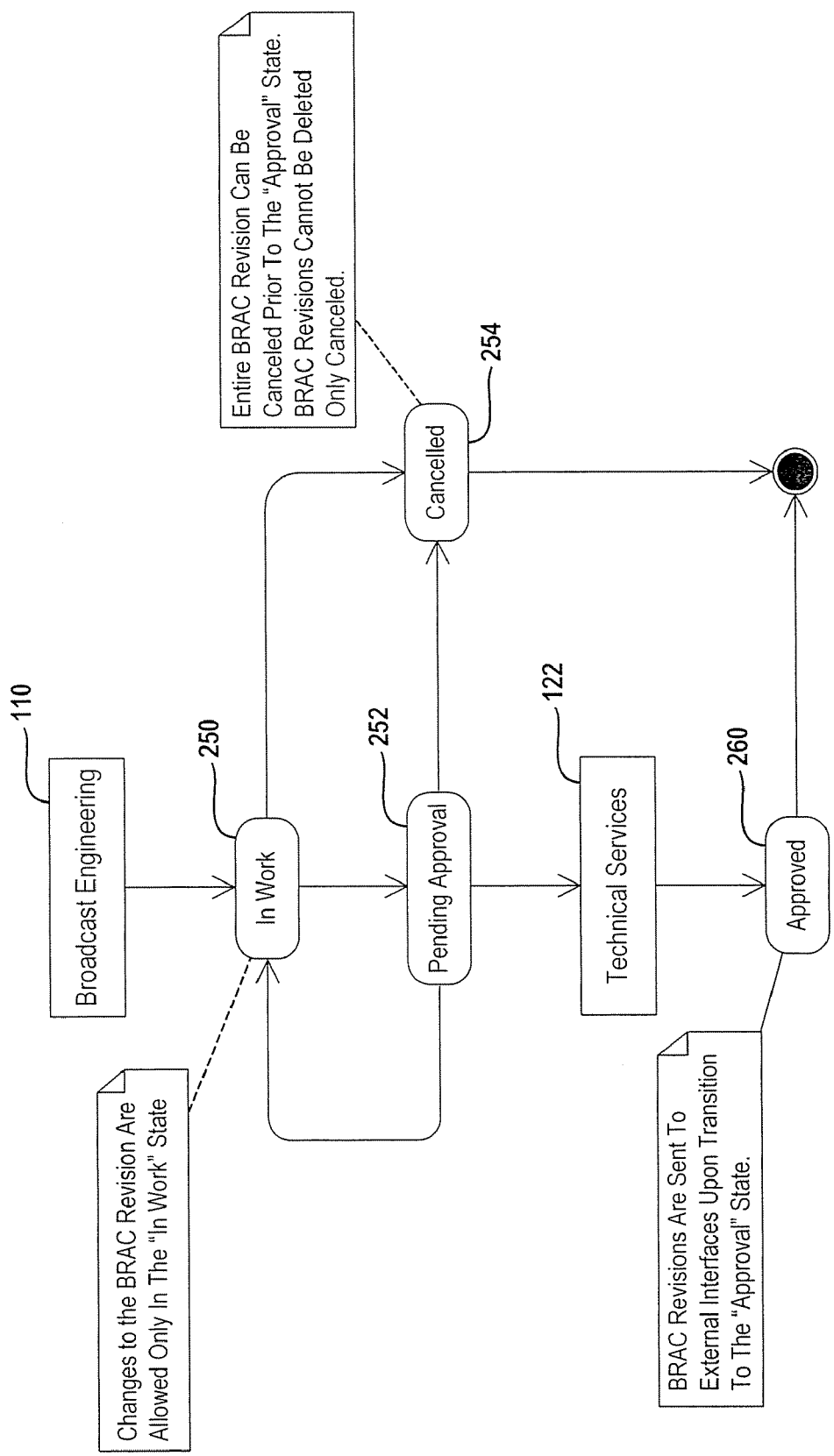
FIG. 4 is a flowchart of an approval process according to the present disclosure.

Referring now to FIG. 4, a process for approving a bit rate allocation chart is illustrated. In step 110, broadcast engineering through a user interface may desire to modify, alter or add a new bit rate allocation chart. Changes may be made while the status of the bit rate allocation chart is in an in-work state 250. After the bit rate allocation chart data is provided an approval must be provided. Before an approval is provided but after the data is entered, a pending approval state 252 may be entered. If approval is not granted, the in-work state may again be revisited. Both the in-work state and the pending-approval state may also be cancelled in step 254 at any time. Technical services 122 of FIG. 2 may approve the bit rate allocation chart. An approved state may be granted by the technical services. Upon the approved state, the various external interfaces for the various components may be provided with the desired data and data format previously requested. The transition from the pending-approval state to the approval state may automatically allow the data to be provided to the various broadcast components.

Figure 5:
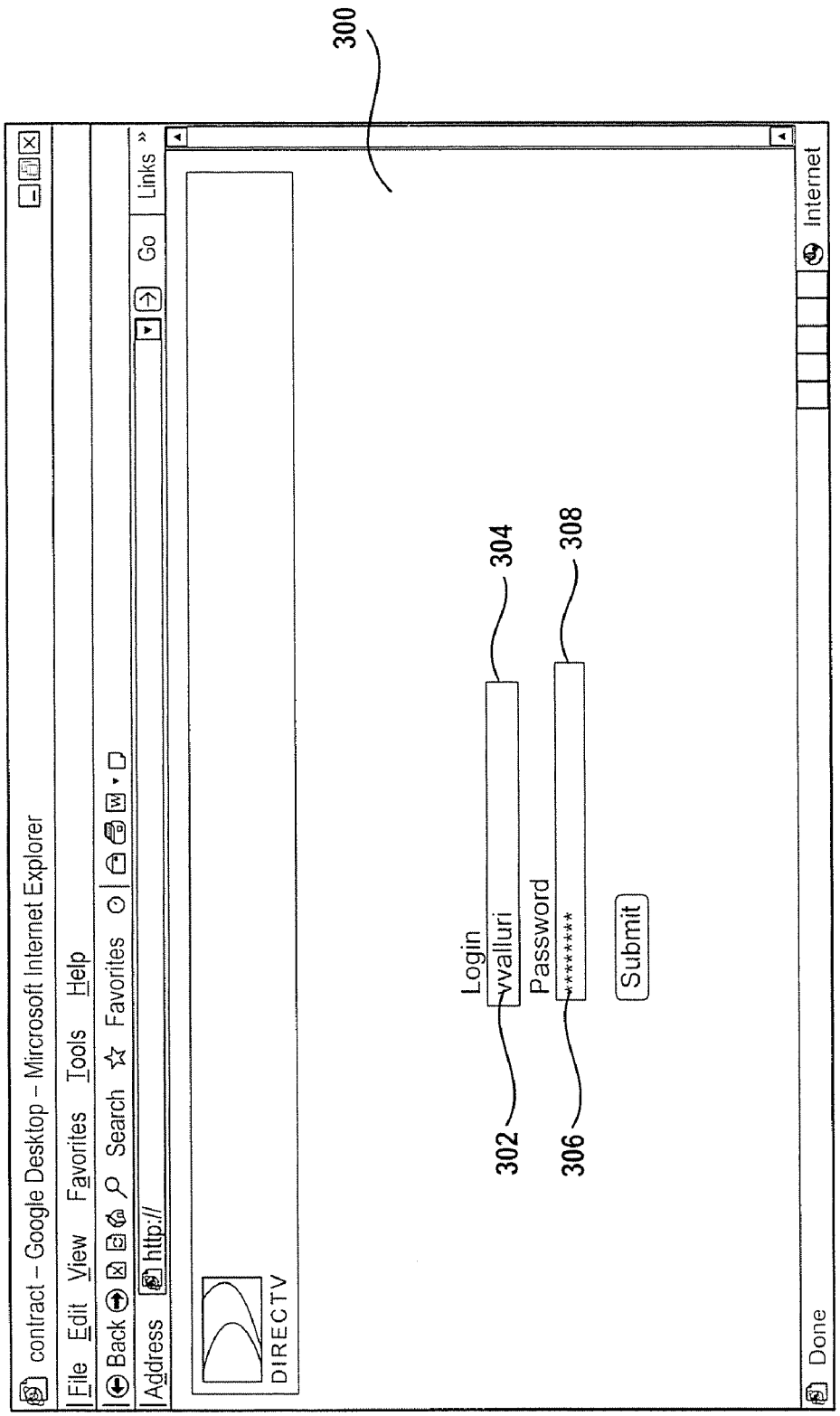
FIG. 5 is a screen display of a user interface of the broadcast operation channel management system.

Referring now to FIG. 5, the BMS 112 of FIG. 2 may be used to provide a user interface at a home or remote computer 222 or a linked computer 226 as illustrated in FIG. 3. A user interface 300 is provided that requires a login identifier 302 in a login box 304. A password 306 is required to be entered in the password box 308 for security. Based upon the security status associated with the login, access to change, alter, view and edit various portions of the allocation chart for the broadcast system may be provided.

As is illustrated in FIG. 5, a Windows-based login and system may be provided. Functional privileges may be granted based upon the login assigned role.

Figure 6:
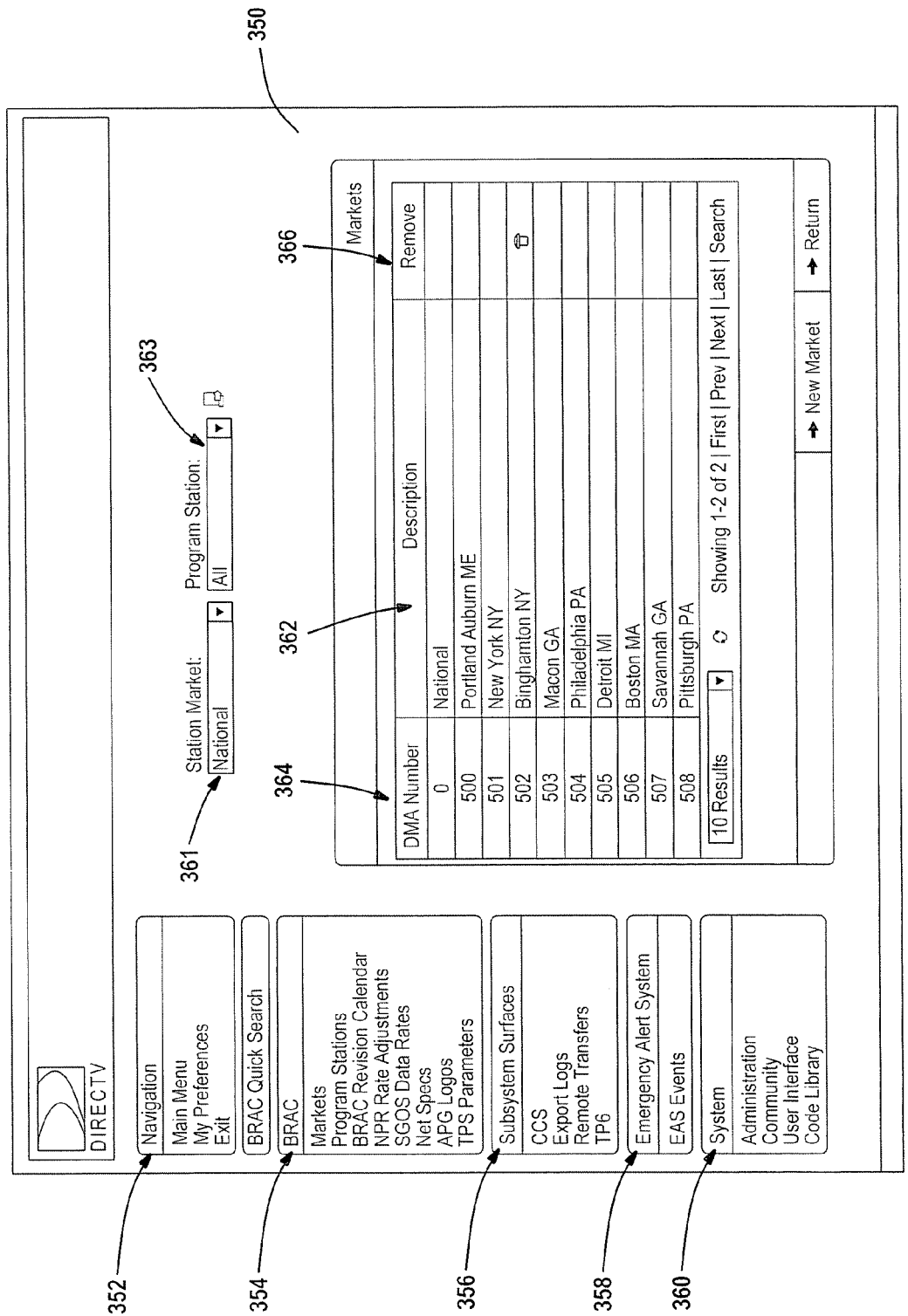
FIG. 6 is a screen display of a broadcast operation channel management system navigation user interface.

Referring now to FIG. 6, a user interface 350 provided after a proper login has been presented. The interface 350 corresponds to a "market" selection from menu 354. The BMS 112 may be used to generate a bit rate allocation chart (BRAC) that has bit rate allocation data therein. On the left side of the user interface 350, a navigation menu 352 is provided. The navigation menu 352 may include a main menu selection, a my preferences selection and an exit selection. Various portions of the bit rate allocation chart may be edited from selections from menu 354. The present disclosure is set forth with these selections in the menu 354, but is not limited thereto. In this example, the column 354 includes markets, program stations, a BRAC Revision Calendar, a BRAC Approval, null packet replacer (NPR) rate adjustments, standard grade of service (SGOS) data rates, digital video broadcast (DVB) service information, a net specification, an advance program guide (APG) logo and TPS parameters.

A subsystem interface column 356 may also be provided with various subsystems therein. Thus, the system may be used for editing information for specific subsystems. Examples of subsystems in the subsystem column 354 include the compression control system (CCS), export logs, remote transfers and the transport processing system (TPS). If a content management system is used, a CMS link may also be provided.

An Emergency Alert System (EAS) menu 358 may provide a link to a user interface to edit emergency alerts. A community link, a user interface link and a code library link. A system utilities menu 360 may include an administration link, a community link, a user interface link and a code library.

The interface may display various station markets in column 361 and a program station list in column 363. The corresponding designated marketing area (DMA) number may be set forth in column 364. A "remove" column may be set forth as column 366 to remove the particular line of data.

Figure 7:
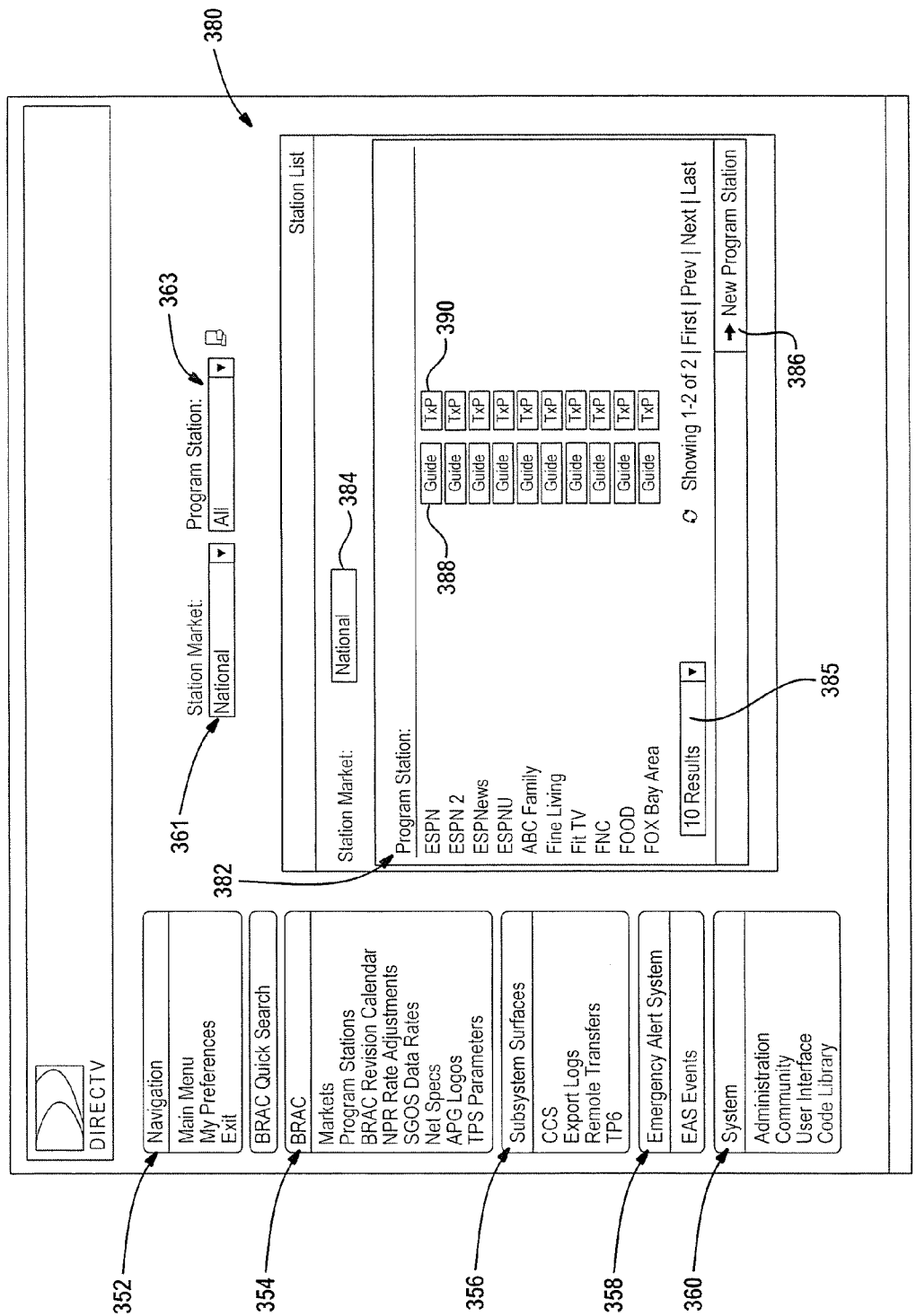
FIG. 7 is a screen display of a program station list user interface.

Referring now to FIG. 7, a user interface 380, similar to that described above with respect to FIG. 6, is illustrated. The same components are labeled with the same reference numerals. In this example, a program station list 382 for national markets is illustrated and set forth in the station market box 384. In this example, 10 stations are illustrated in the list. However, a results box 385 may be provided to change the number of results displayed to the user. Although national stations are illustrated, various other types of lists may be provided that include a station market. A new program station may be added by clicking on the new program station link 386. A station listing may act as a link to update or view the details therein.

A guide channel list may be selected by clicking on a guide link button 388 for the appropriate channel. A transponder link 390 may generate a transponder user interface for the program station.

Figure 8:
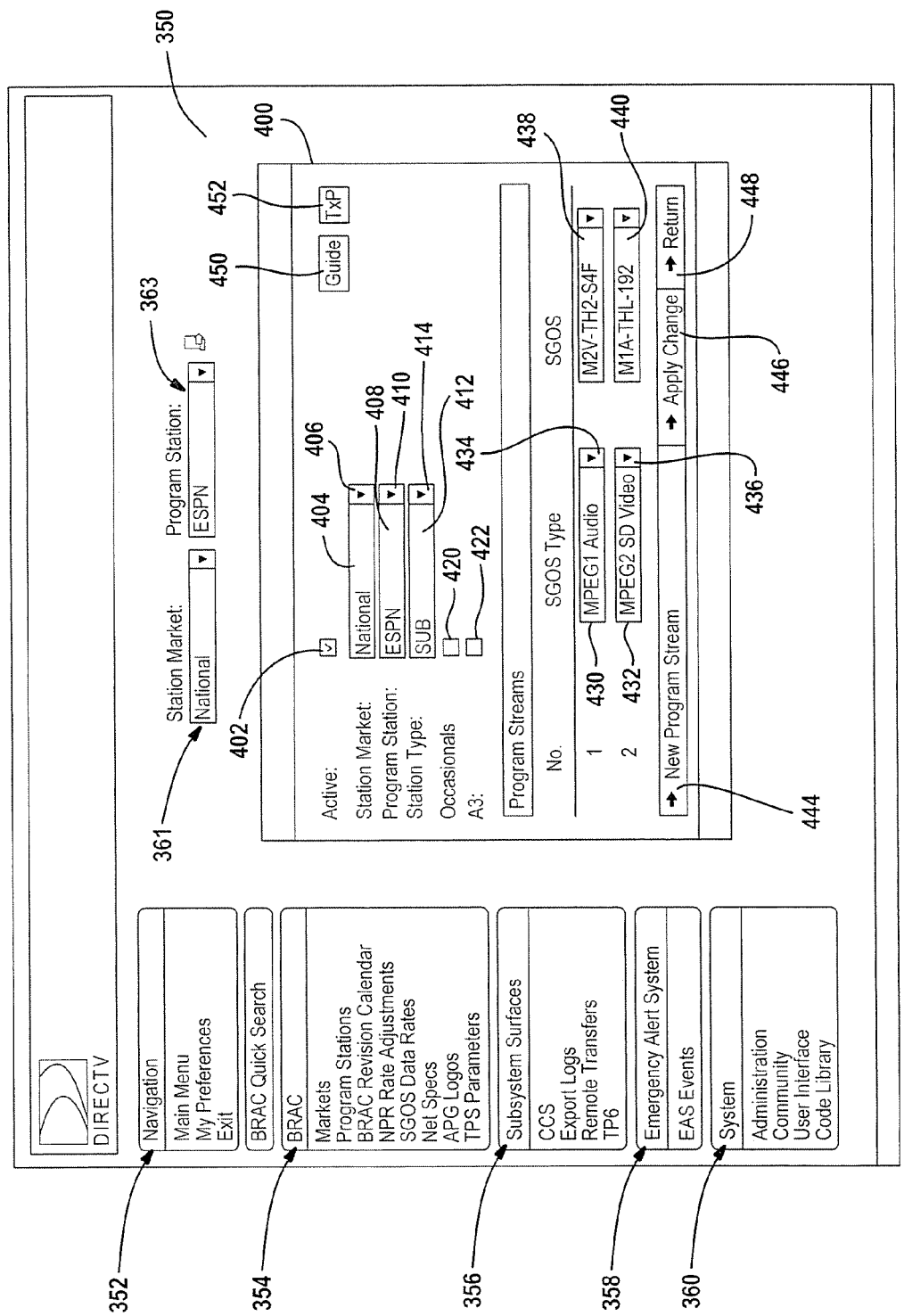
FIG. 8 is a screen display of a program station detail user interface.

Referring now to FIG. 8, when one of the station links is selected from the list 382 of FIG. 7, a program station definition user interface 400 is presented to the user. This user interface includes an active box 402 which, when checked, makes the particular program station definition active. By unchecking the box 402 or clicking within the box, the check may be removed and the program station definition may be inactivated.

A station market box 404 may be provided that presents the user with the station market. This may also be changed by selecting the down arrow box 406. A program station box 408 provides the program station to the operator. A down arrow box 410 may be selected for other options. A station-type box 412 may also be presented. An arrow box 414 may be set forth to change the station type. A check box for an occasional channel 420 and an A3 box 422 may be presented for A3-type programming. Thus, the program station details may be updated in the upper portion of the user interface 400.

The program streams may also be updated. In the present example, two program streams are set forth. Program stream No. 1 includes a standard grade of service (SGOS) type box 430 which, in this example, is MPEG1 audio. Program stream No. 1 includes an SGOS-type box 432 which, in this example, is MPEG2 standard definition (SD) video. The respective arrow boxes 434 and 436 may be selected to change the standard grade of service type. The standard grade of service type may also be set forth using a code in the respective boxes 438 and 440. New program streams may be added by clicking on the new program stream link 444. Changes to the above may be applied by clicking on the apply change link 446.

A return link 448 will return to the previous user interface set forth in FIG. 7. A guide link 450 may be used to link to the associated guide channel list. A transponder link 452 may be used to link to the associated transponder user interface page.

Figure 9:
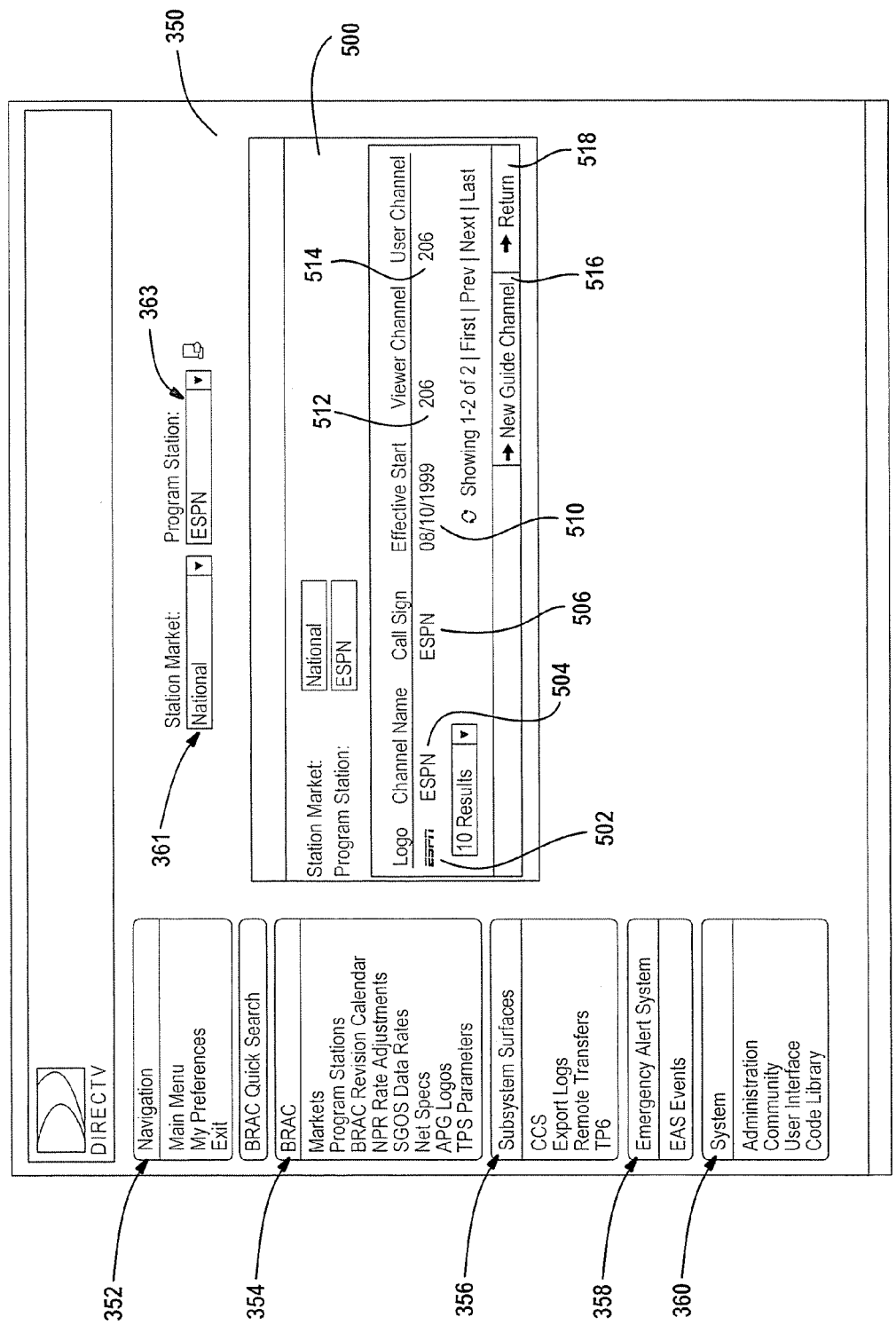
FIG. 9 is a screen display of a guide channel list user interface.

Referring now to FIG. 9, by clicking on the guide channel links of FIG. 7 or 8, the guide channel user interface 500 may be presented to the user. A list of guide channels for a program station is illustrated with various types of information. Of course, the present example provides a number of types of data but may be changed depending on particular requirements. In this example, a logo field 502, a channel name 504, a call sign 506, an effective start date 510, a viewer channel number 512, and a user channel number 514 are presented within the user interface 500. A new guide channel may be added by clicking on the guide channel link 516. To return to the previous menu of FIG. 8, the link 518 may be clicked. In addition, the station market may be presented in a station market box 520 and a program station box 522 may present the user with a particular program station. By clicking on the various guide channels, the guide channel may be edited by the user.

Figure 10:
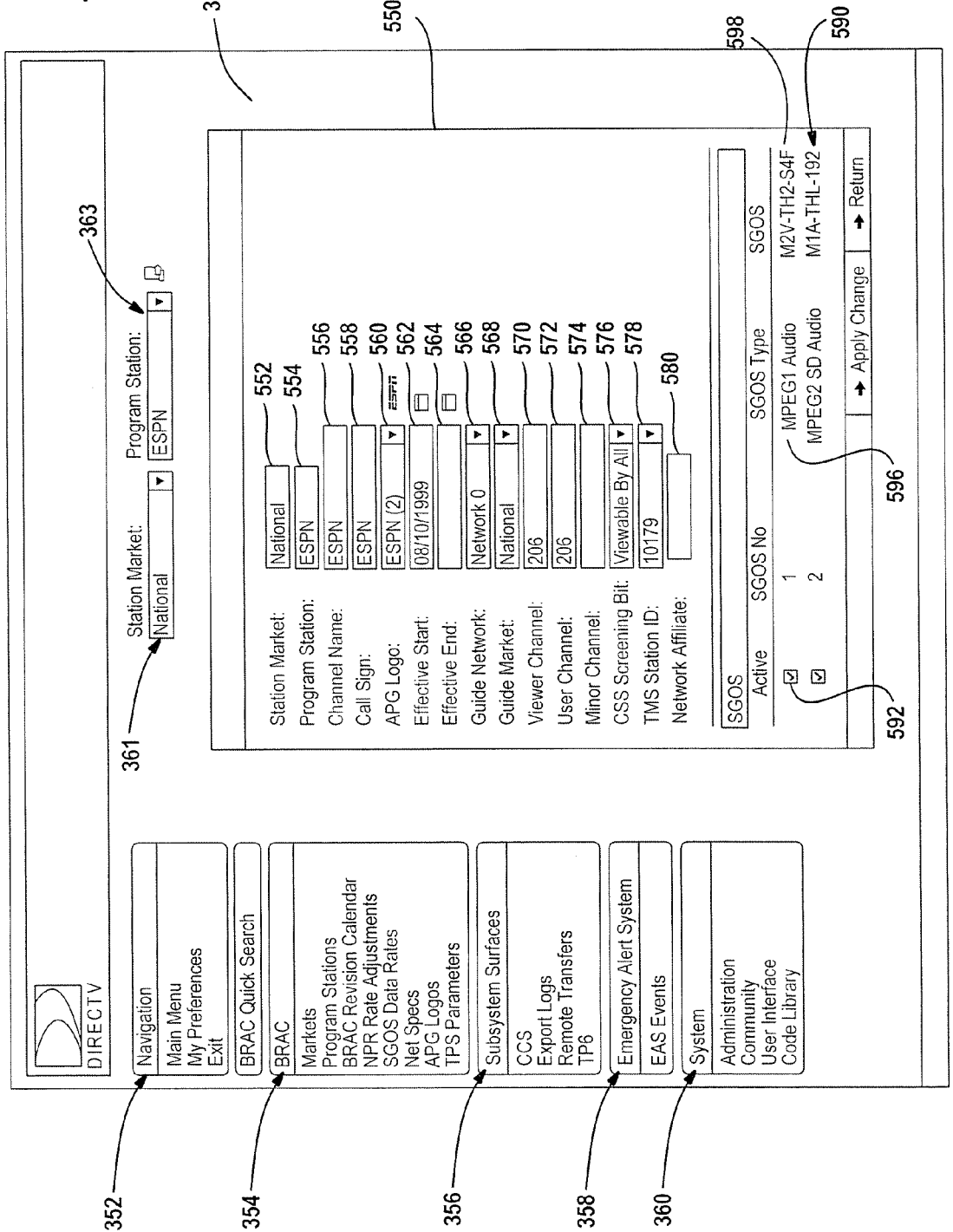
FIG. 10 is a screen display of a guide channel detail user interface.

Referring now to FIG. 10, when one of the guide channels is selected, the guide channels may be edited or updated using the broadcast operation channel management system guide channel user interface 550. In the guide channel user interface, a station market box providing the station market 552 may be provided. The program station identifier box 554 may also be presented. The channel name 556 and the call sign 558 may also be provided. The program guide logo box 560 may provide the particular logo for the program station. The effective start date may be provided in the effective start date box. An effective end date box 564 may also be provided should the station have an effective end date. In this example, the effective end date has been left blank.

A guide network box 566 and a guide market box 568 may also be provided to provide the guide network and guide market to the program guide. A viewer channel box 570 and a user channel box 572 may also be provided. Should a minor channel also be associated with the program station, a minor channel box 574 may also be provided. A CSS screening bit box 576 may be provided to set the availability of the program station. A Tribune Media Services® station ID box 578 may provide the TMS station identifier 578. A network affiliate box 580 may also be provided to communicate the network affiliate associated with the program station. In this example, there is no network affiliate.

The user interface 550 may also include a standard grade of service (SGOS) portion 590 which includes the different standard grades of services provided by the program station. In this example, two standard grades of services are provided. Each includes an active box 592, the standard grade of service number 594, the standard grade of service type 596 and the standard grade of service identifier 598. The active box 592 may be selected or deselected to activate or deactivate the standard grade of service.

Figure 11:
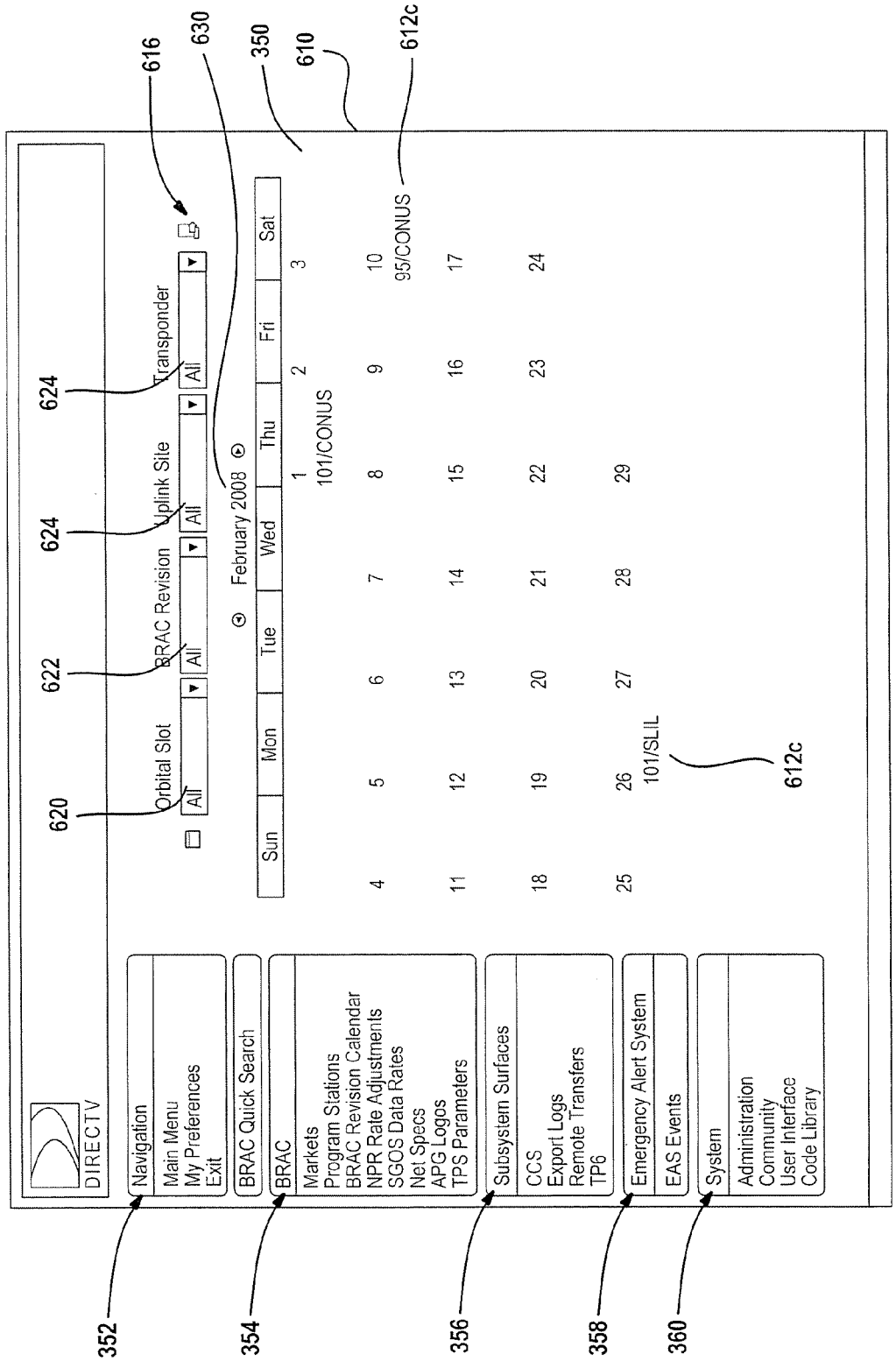
FIG. 11 is a screen display of a bit rate allocation calendar user interface.

Referring now to FIG. 11, a calendar user interface 610 is illustrated. The user interface 610 includes entries 612a, 612b and 612c which illustrate the bit rate allocation charts that are effective as of those particular days. Each of the entries 612a-612c is links that, when clicked on, will link to a bit rate allocation chart revision detail. As illustrated, the links 612a-612c are set forth because the level identifiers 616 are set to "ALL." Individual identifiers for obtaining different levels are set forth in the orbital slot box 620, the bit rate allocation chart revision box 622, the uplink site box 624, and the transponder box 626. The orbital slot box allows the revisions for a particular orbital slot or slots to be selected. The bit rate allocation revision box 622 allows only the bit rate allocation revisions of interest to be displayed. The uplink site box 624 allows the bit rate allocation charge for a particular uplink site to be displayed. The transponder box 626 allows only the bit rate allocations for a particular transponder to be displayed.

The boxes 616 thus allow a calendar view of particular orbital spots, revisions, uplink sites and transponders as may be selected for the individual criteria.

A calendar date identifier 630 may identify the particular day and month of the calendar displayed on the user interface 610.

Figure 12:
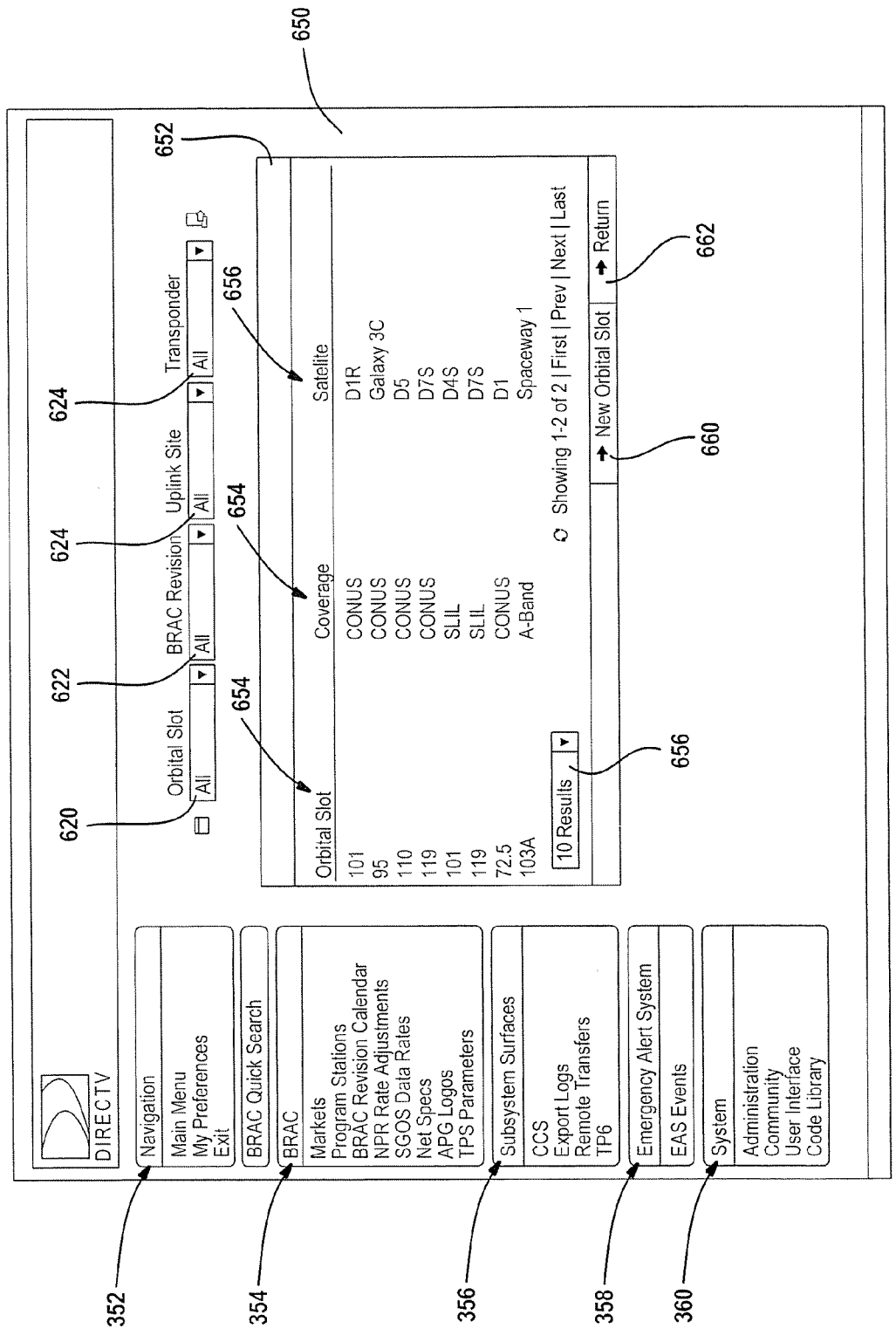
FIG. 12 is a screen display of an orbital slot list user interface.

Referring now to FIG. 12, an orbital slot list user interface 650 is illustrated. In this example, the perimeter of the user interface 650 may be identical to that illustrated above in FIG. 11. The upper boxes 660 may be used to select various orbital slots if desired. In this example, all orbital slots have been set forth. The orbital slot list user interface 652 includes an orbital slot column 654 illustrating various orbital slots. A number of results may be displayed in the results box 656. However, the number of results illustrated on a particular user interface 652 may be changed according to user preferences. A coverage column 654 may also be provided for each orbital slot. The coverage may include the Continental United States (CONUS), spot beam local into local coverage (SLIL) and a-band coverage. A satellite column 656 may also be provided which illustrates the type of internal name of the particular satellite. Other data such as the APG Network ID and whether the channel is received through a local collection facility may be provided.

Each orbital slot may act as a link that, when clicked on, displays further results corresponding to the bit rate allocation chart.

To add a new orbital slot, the orbital slot link 660 may be selected by the user. To return to the previous menu, box 662 may be selected.

Figure 13:
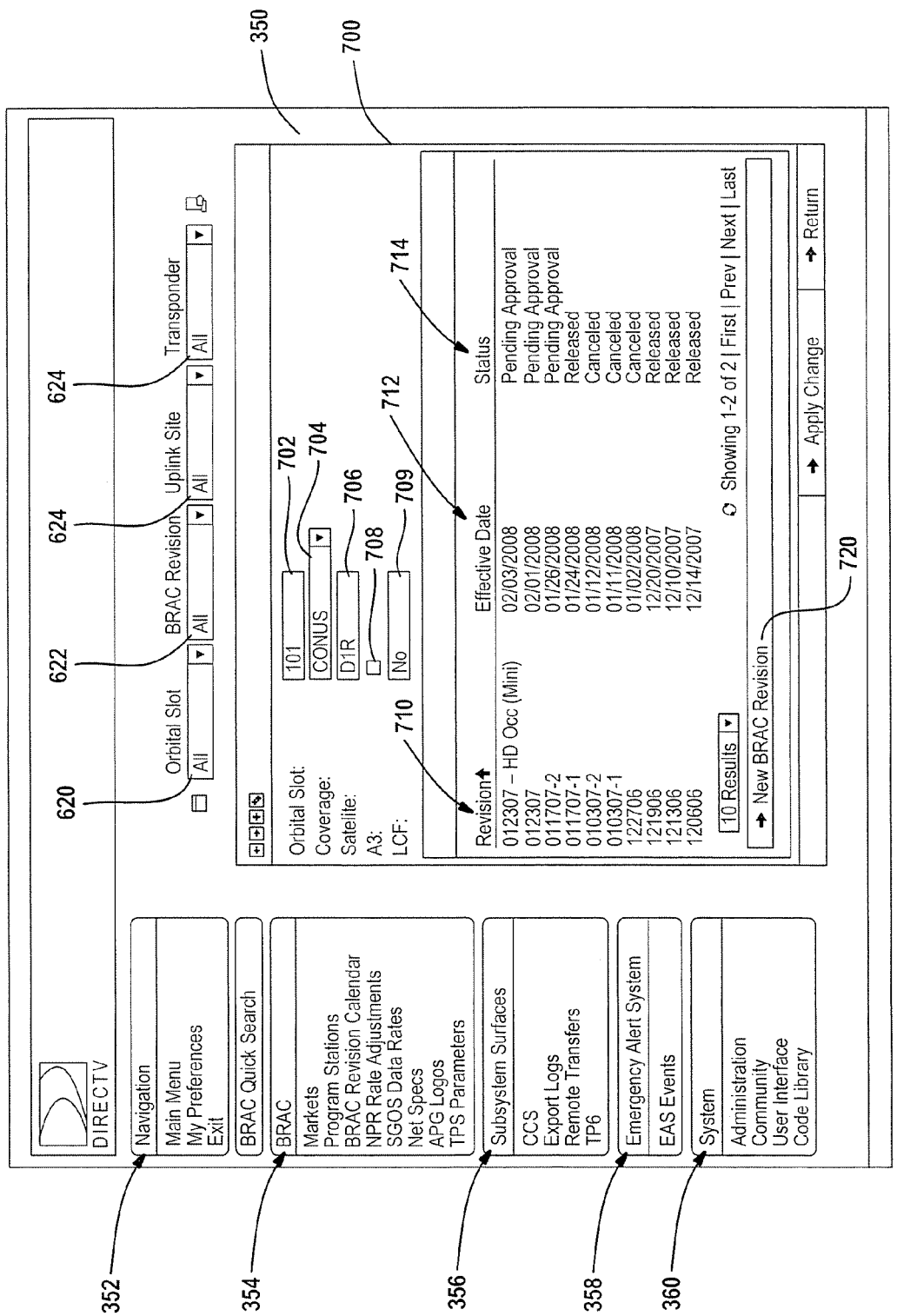
FIG. 13 is a screen display of an orbital slot detail user interface.

Referring now to FIG. 13, orbital slot detail user interface 700 may be provided. In this example, the user interface 700 may be reached by clicking on the "101" orbital slot of FIG. 12. In this example, the orbital slot box 702 illustrates the orbital slot, the coverage box 704 illustrates the particular coverage for the orbital slot and box 706 illustrates the particular satellite name. When box 708 is checked, the satellite provides A3 coverage. Box 709 provides information as to whether the channel is collected in a local collection facility.

The user interface 700 includes a revision list 710, an effective date list 712 and a status list 714. The revision list provides a revision number and an indicator BRAC is a mini BRAC. The effective date list provides an effective date for each of the revisions. The status column 714 provides a pending approval, released or approved status and a cancelled status. A new BRAC revision may be provided by clicking on the new BRAC revision link 720. A BRAC revision may be selected by clicking on one of the revisions in the list which will allow various details of the revision to be set forth. Edits may also be made by clicking on the revision type link to bring up the full orbital slot list.

Figure 14:
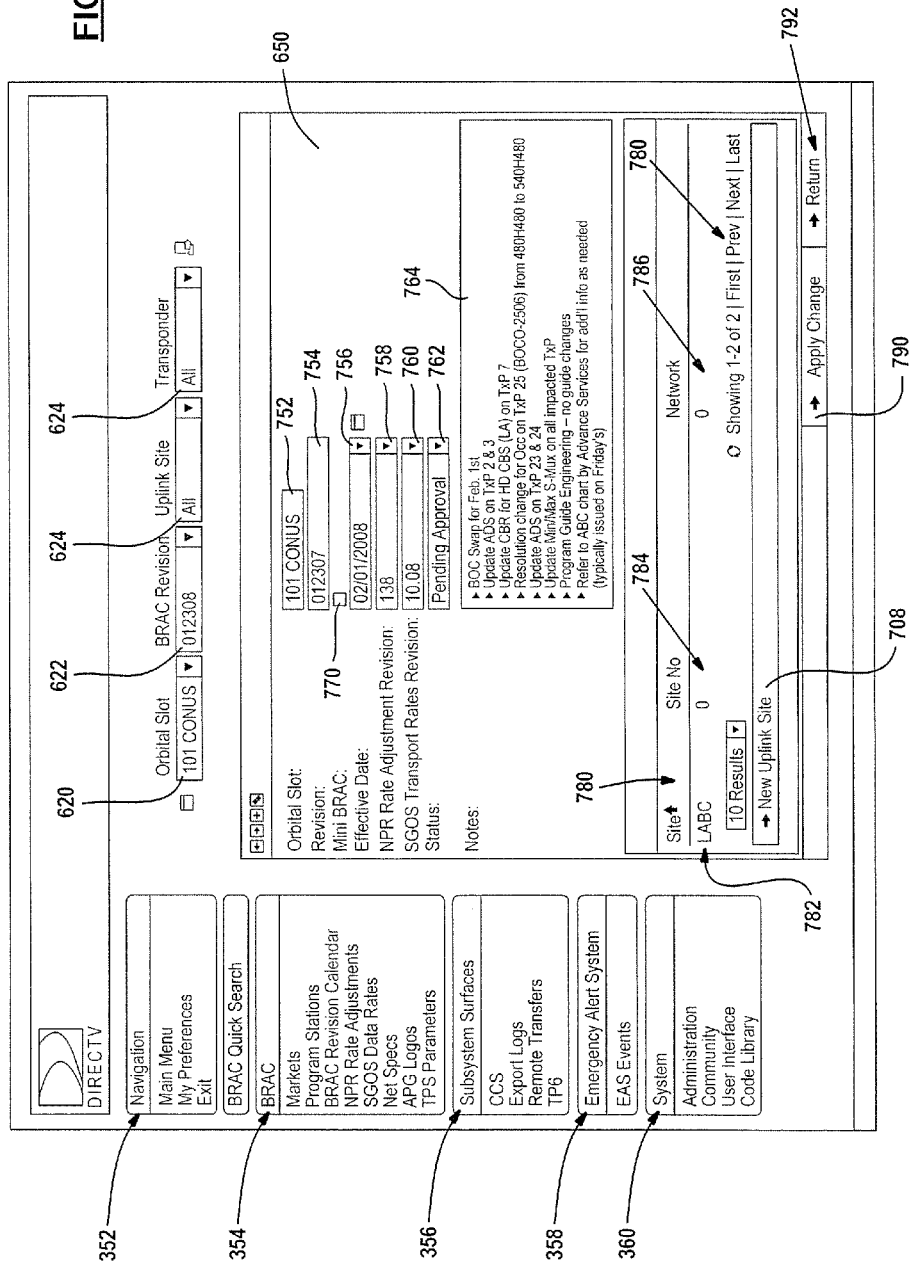
FIG. 14 is a screen display of a bit rate allocation revision user interface.

Referring now to FIG. 14, a BRAC revision detail user interface 750 is set forth. This revision user interface 750 may be achieved by selecting one of the revisions in the list 710 of FIG. 13. The revision user interface 750 includes an orbital slot box 752 with the orbital slot, a revision box 654 providing a revision number, an effective date box 756 having a revision date therein, a null packet replacer adjustment revision box 758 illustrating the null packet replacement adjustment revision, a standard grade of service transport rate revision box 760 illustrating the transport rate revision and a status box 762 illustrating the status of the particular revision. A notation box 764 may be used to provide various notes regarding the various revisions. A mini-BRAC box 770 may also be provided. When checked, the bit rate allocation is for a mini-BRAC and not a full BRAC. The boxes 616 also provide redundant information for the particular orbital slot, BRAC revision, and the like. A site list 780 may also be provided to illustrate the various uplink sites associated with the orbital slot to the user. In this example, the Los Angeles Broadcast Center site is provided in the site indicator 782. The site number which, in this case, is "zero" is illustrated in link 784. The network number is also provided in location 786. By clicking on the new uplink site link 788, a new uplink site may be added to the bit rate allocation chart. An apply change link 790 may also be provided that allows the changes made in the user interface 750 above to be applied. A box 792 may be used to return to the previous user interface.

Navigation guides, such as first, previous, next and last, may be provided. Also, the various page numbers may also be provided.

Figure 15:
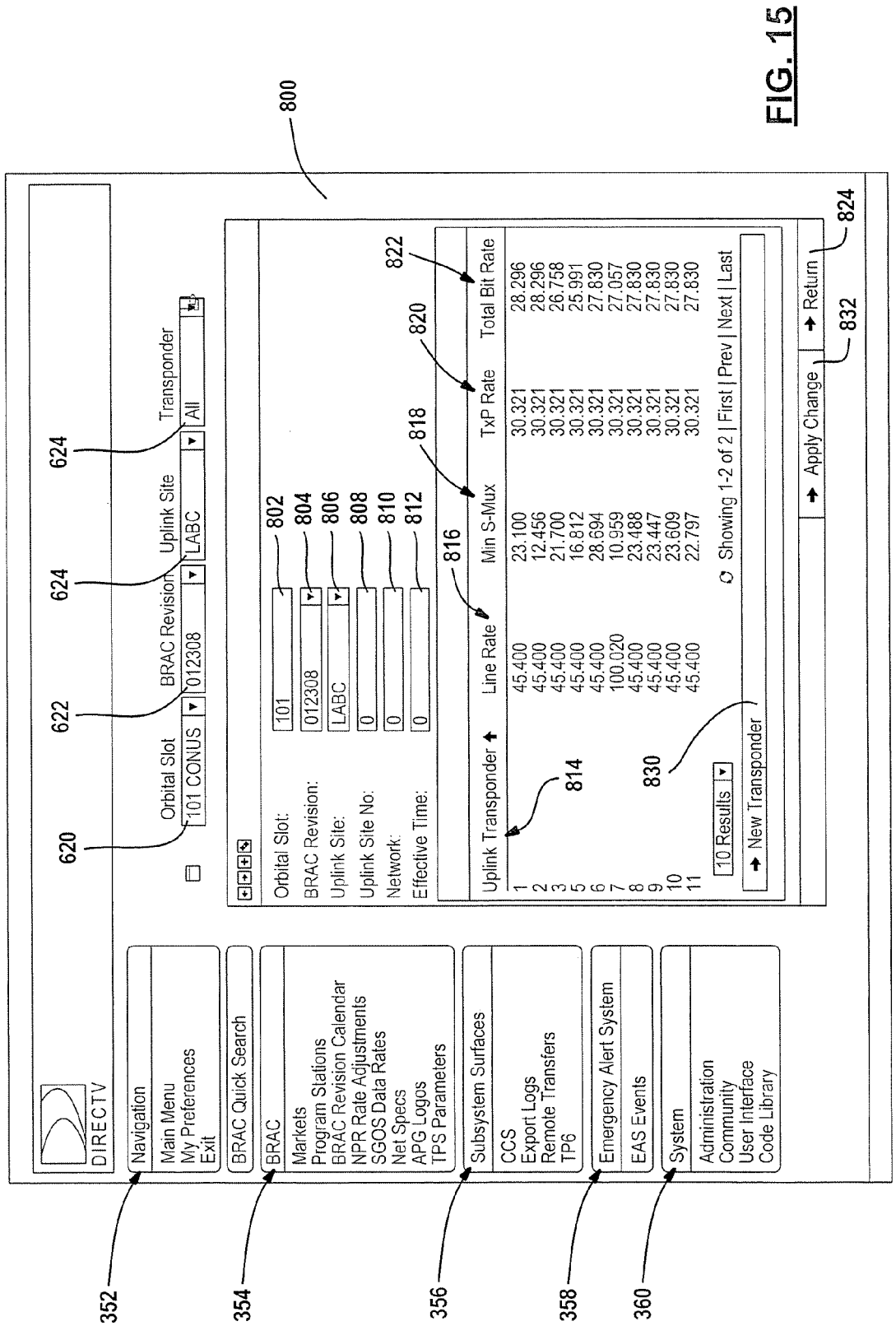
FIG. 15 is a screen display of an uplink site user interface.

Referring now to FIG. 15, an uplink site revision user interface 800 is illustrated. In this example, uplink site details may be updated or added. In this example, in an orbit slot box 802, a BRAC revision box 804, an uplink site box 806, an uplink site number box 808 and a network box 810 are provided. An effective time box 812 provides the effective time of the revision. An uplink transponder list 814 is provided with the transponders associated with the orbital slot. A line rate list 816 is provided so that the line rate of each transponder is set forth. A minimum statistical multiplexing box 818 is provided to provide the minimum statistical multiplexing rate. A transponder rate column 820 may also be provided for providing a transponder rate. A total bit rate column 822 may display total bit rate for the transponder.

Each one of the numbers in the uplink transponder list 814 act as a link. By clicking on a transponder number, the various details for the uplink transponder are displayed and are allowed to be changed or updated. If a new transponder is desired to be entered into the bit rate allocation chart, a new transponder link 830 may be clicked on by the operator. Should changes be made, an applied change link 832 may be provided. A return link 824 may also be provided to return to the previous menu.

Figure 16:
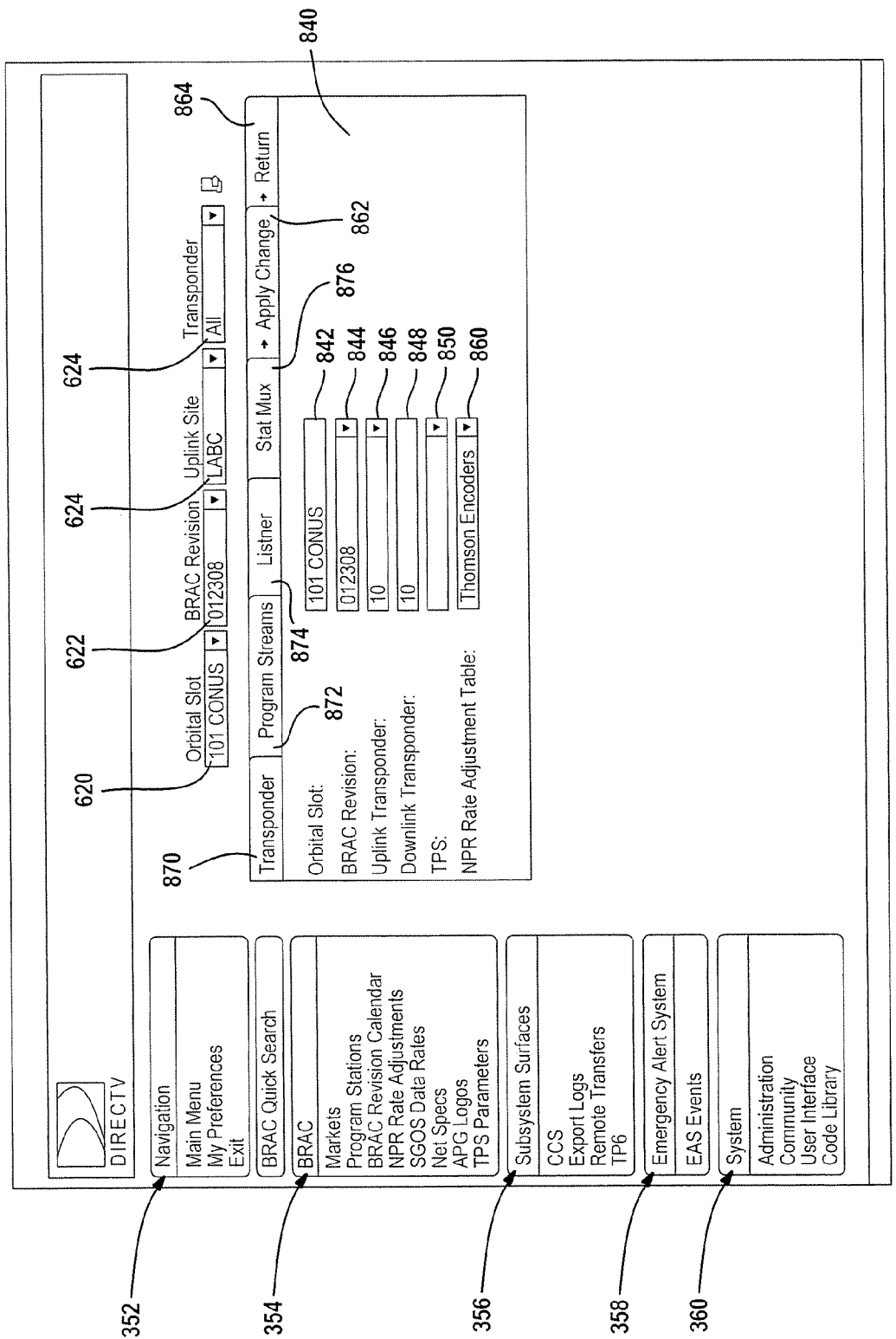
FIG. 16 is screen display of a transponder user interface.

Referring now to FIG. 16, user interface 840 may be set forth. Tabs may be provided at the top of the user interface 840 for changing various information. The transponder interface corresponds to the transponder tab. The transponder interface 840 may include an orbital slot box 842, a BRAC revision number 844, an uplink transponder number 846, a downlink transponder number 848, a transport processing system number 850 and an encoder type 860. One or all of the various boxes 842-860 may be changed with user intervention. An applied change tab 862 may be used to apply the change to the particular bit rate allocation chart. A return link tab 864 may be provided to return to the previous user interface.

The tabs for the user interface may include a transponder tab 870, a program streams tab 872, a listener tab 874 and a statistical multiplexing tab 876.

Figure 17:
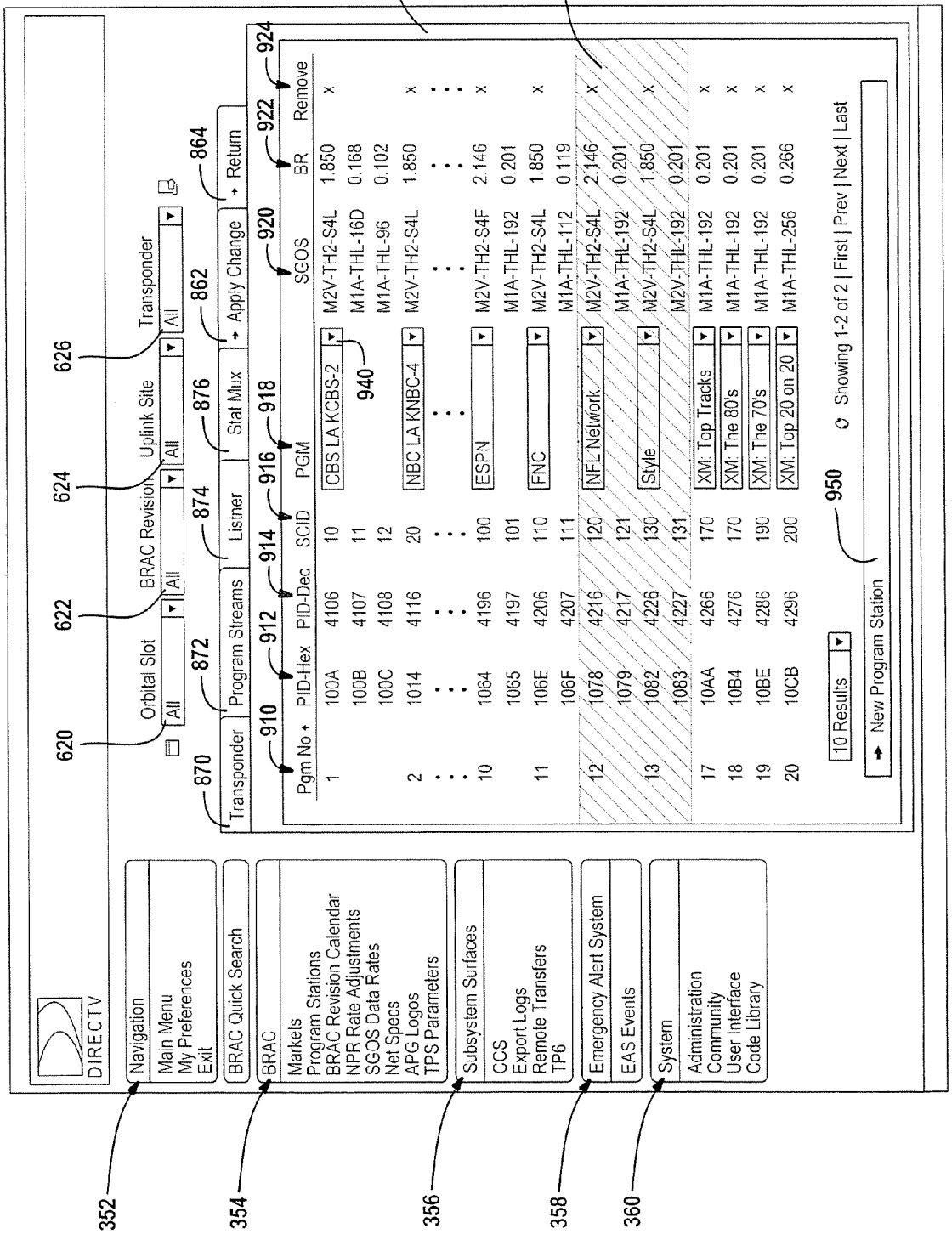
FIG. 17 is a screen display of a transponder program stream list user interface.

Referring now to FIG. 17, a transponder program stream user interface 900 is illustrated. The transponder program stream user interface 900 may be reached by selecting the program streams' tab 872 of FIG. 16. The program streams tab 872 includes a program number column 910, a program identifier (PID) tab in hexadecimal 912, a program identifier tab in decimal 914, a service channel identifier column 916, a program identifier column 918, a standard grade of service column 920, a bit rate column 922 and a remove column 924. As illustrated, a portion 930 of the user interface 900 may be highlighted using coloring or shading to illustrate changes from the previous bit rate allocation revision. The program streams in column 918 may be automatically pulled from the program station definition. The default bit rates may be pulled from the standard grade of service tables illustrated above. The program streams may be updated by selecting the arrow button 940 by selecting a service channel identifier or a packet identifier (PID) the particular item may be revised. Again, by selecting the "APPLY CHANGE" tab 862, the change may be applied to the bit rate allocation chart. Return tab 864 returns the user interface display to the previous user interface displayed.

Should a new program station be desired to be added to the bit rate allocation chart, the new program station link 950 may be selected to add a program station to the transponder.

Figure 18A:
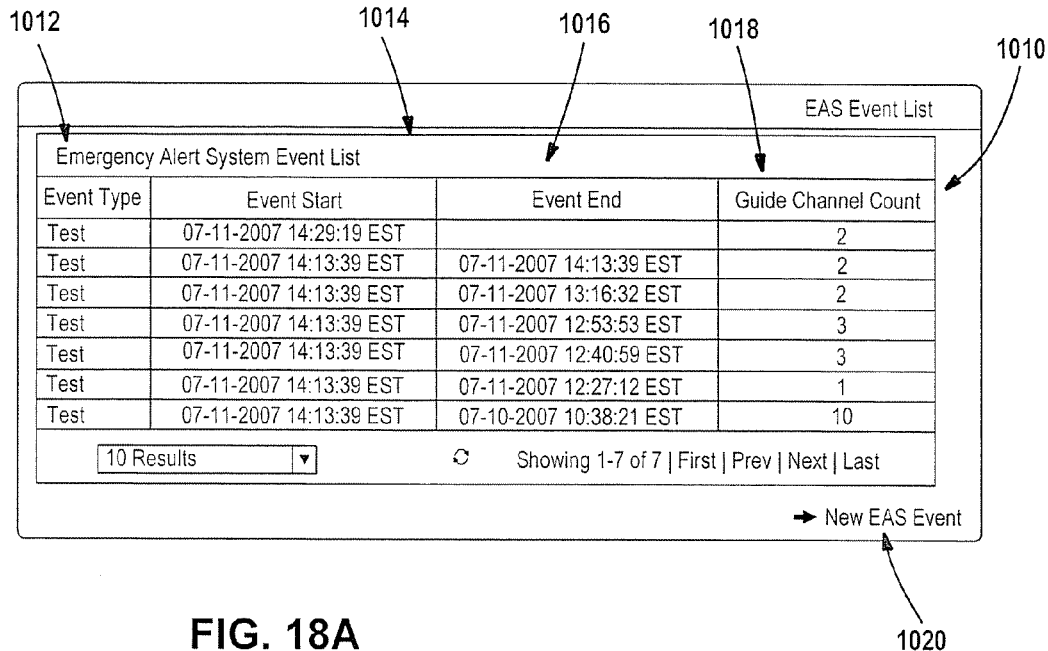
FIGS. 18A and 18B are screen displays of an Emergency Alert System user interface for starting and stopping emergency and test alerts.

Referring now to FIG. 18A, a user interface 1010 for an emergency alert system is illustrated. The emergency alert system allows the user interface to start and stop emergency alert events. These events can be test events or actual emergencies. To access the emergency alert system user interface, the link on the side menu may be accessed. The emergency alert system user interface may include a column that displays an event type 1012, an event start time 1014, an event end time 1016, and a guide channel count 1018. The guide channel count as illustrated has various numbers of channel counts for each row. By selecting one of the rows, more detailed information as to the event may be provided.

A new EAS event link 1020 may also be provided.

Figure 18B:
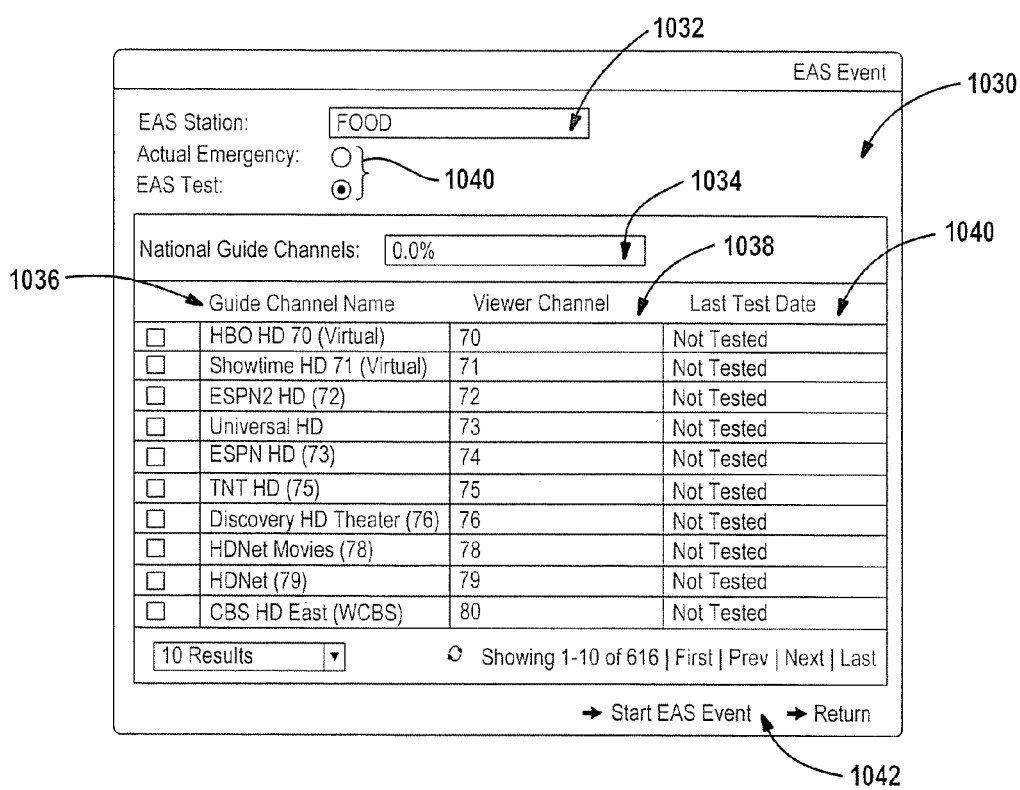

Referring now to FIG. 18B, by selecting the link of the Emergency Alert System (EAS event) user interface 358 of FIG. 16 or the new EAS event link 1020 of FIG. 18A, an event details user interface 1030 may be obtained. In this screen display, the 10 guide channels are listed that were included in the test. The EAS station may be provided in box 1032. An actual emergency selector or a test selector may be provided in the area 1034. A percentage of the national guide channels may also be provided in box 1035. Columns that include the guide channel name in column 1036, a viewer channel column 1038 and a last test date 1040 may be provided. In this way, individual information regarding various channels may be provided to the operator. To start an EAS event, the start EAS link 1042 may be activated so that a test or an event may take place. Either an actual or test event may be selected as set forth in the details page 1030. The current configuration allows only one EAS event to be running at a particular time. However, more than one EAS event may be provided in other systems depending on system operation details. When an EAS event is started, a "stop EAS" link (not shown) may be provided at the bottom of the page in place of the start EAS event link 1042 to end the event. A confirmation of ending the event may also be provided to the user.

Figure 19:
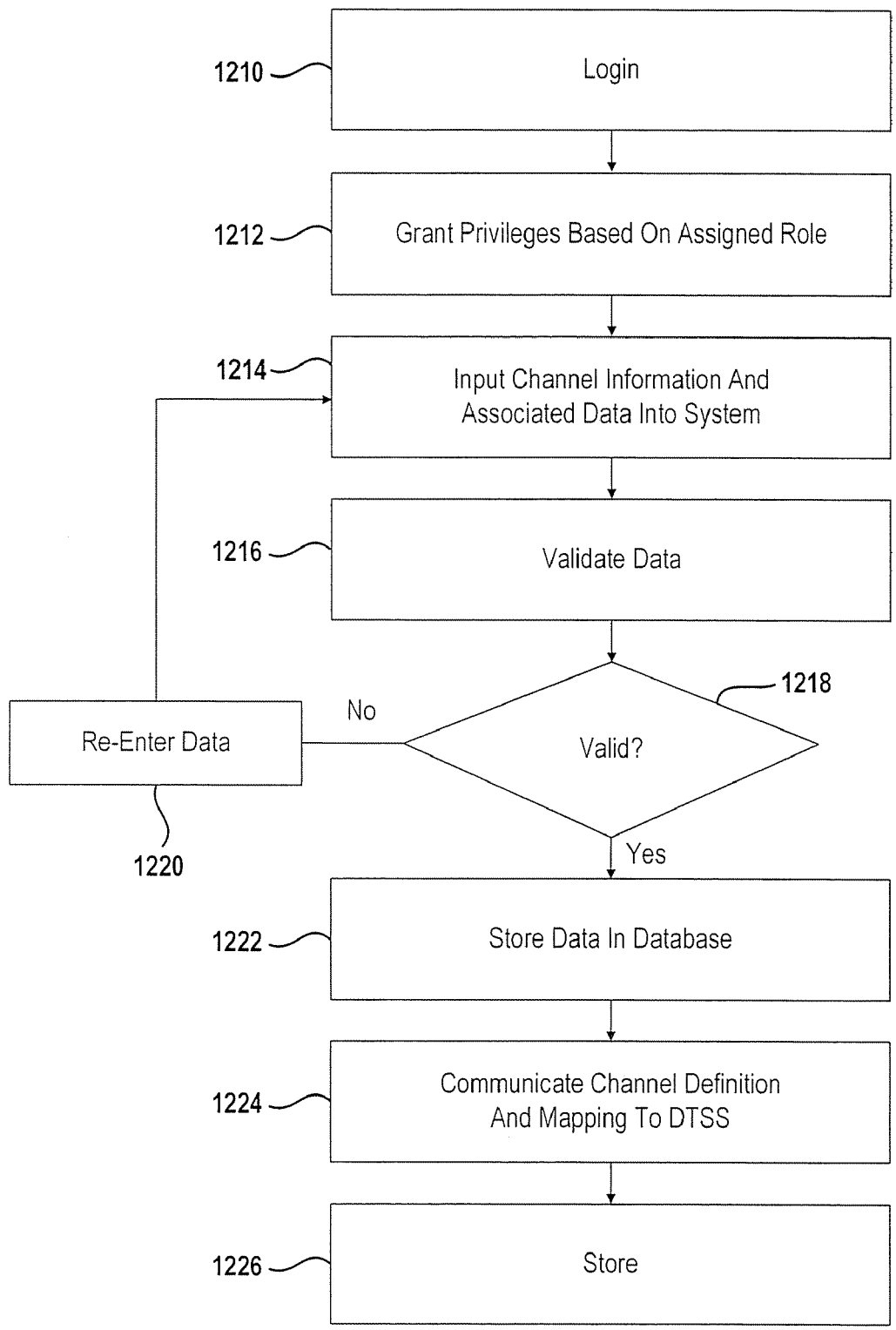
FIG. 19 is a flowchart of a method for operating the broadcast operation channel management system.

Referring now to FIG. 19, a method of operating a broadcast operation channel management system is illustrated. In step 1210, the user or operator logs in and privileges are granted based on the assigned role in step 1212. The login may take place at various locations including internal locations or remote locations. Various levels of personnel may have different levels of privileges to view and modify the bit rate allocation charts. In step 1214, input channel information and associated data are input to the system. In step 1216, before the data entered in step 1214 is applied to a bit rate allocation chart, the data may be validated. The data may be validated by checking the ranges and cross-checking various values within the bit rate allocation chart for consistency. If inconsistent terms are entered, then the data will not be considered valid. In step 1218, if the data is not valid, step 1220 asks the user or operator to re-enter the data in step 1214.

After step 1218, when the data is valid, the data is stored in a database 1222. The database may contain all the elements of a bit rate allocation chart. After step 1222, step 1224 communicates channel definition and mapping to a traffic and scheduling system. Also, other broadcast components may also receive information stored in the database. The other components may include the guide engineering module 114, the compression control system, technical services 122 and the advance broadcast monitoring system 124 all illustrated in FIG. 2.

In step 1226, the various data may be stored in the various components such as the traffic and scheduling system. The data may be used to configure the various components for broadcasting and aligning channels for broadcast over specific transponders.

It should be noted that the channel definitions and mappings may include various data mentioned above with respect to the bit rate allocation chart. Such information may include orbital slot data, satellite coverage, satellite position, a satellite name, uplink and downlink transponder numbers, a spot beam number, a market name, a channel identifier, a channel logo and the like. A revision mode status may also be provided which includes an in-work status, a pending status or an approved status.

Figure 20:
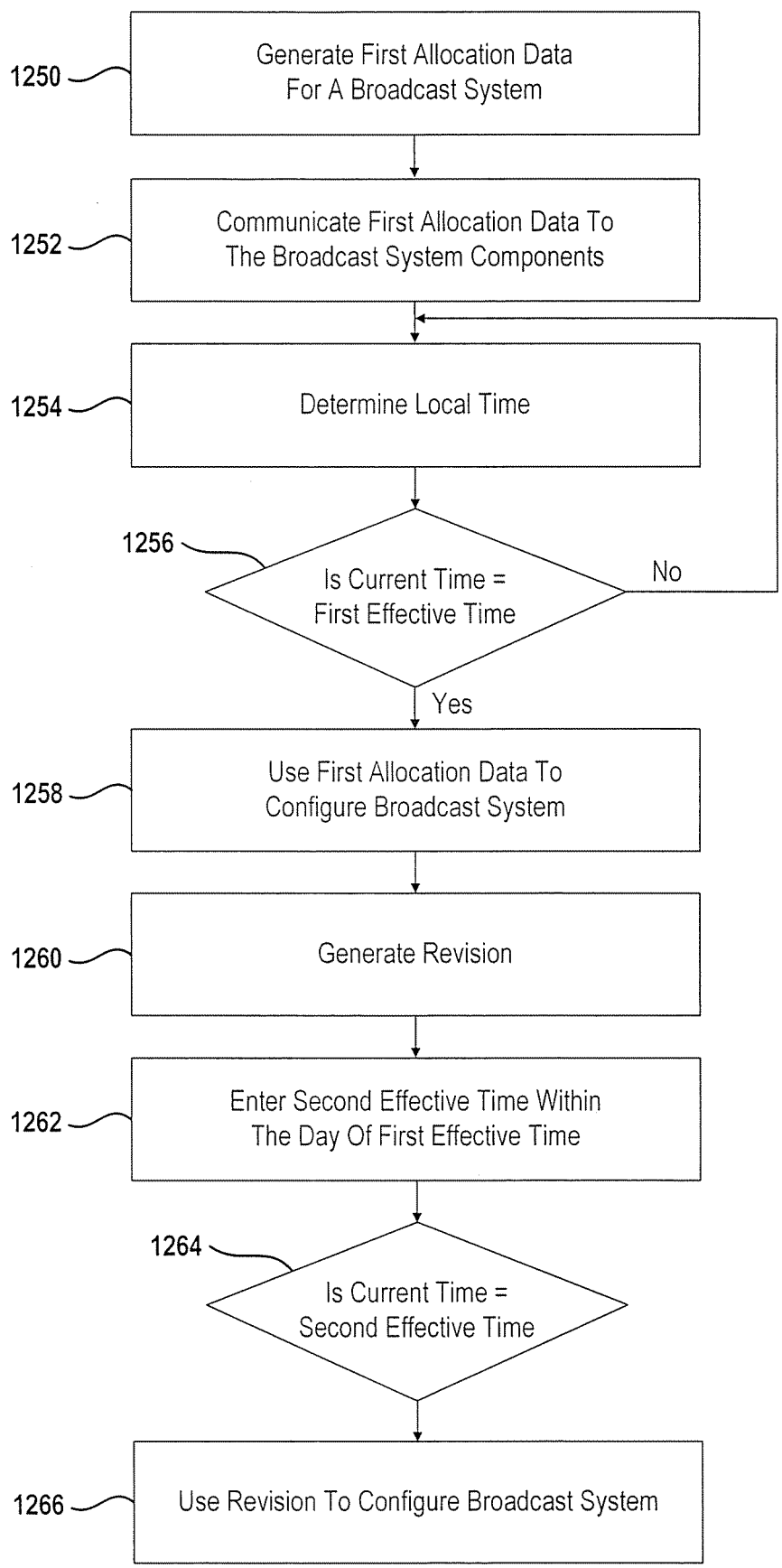
FIG. 20 is a flowchart of a method for configuring a broadcast system.

Referring now to FIG. 20, a method for operating various components of the broadcast system is illustrated. In step 1250, first allocation data for a broadcast system is illustrated. The allocation data may be a bit rate allocation chart. In step 1252, the first allocation data may be communicated from the BMS to the broadcast system components. This communication may take place automatically or with user intervention. As will be mentioned below, the allocation data may be all or merely a portion of the bit rate allocation chart. In step 1254, the local time is determined. As mentioned above, each bit rate allocation chart may have an effective time and date. In step 1256, if the current time is equal to the effective time, the first allocation data is used to configure the portion of the broadcast system in step 1258. In step 1256, if the current time is not equal to the effective time, then step 1256 is again executed until the current time becomes the first effective time.

In step 1260, a revision to the bit rate allocation chart may be generated. Various data may be generated or revised in step 1260.

In step 1262, the second revision may have a second effective data that is within the day of the first effective time. Prior systems typically do not have the ability to change an allocation in a broadcast day. Thus, the systems may be inefficient since the transponder allocation may be desired to be modified during operation due to various changes.

In step 1264, the current time is compared with the second effective time. If the current time is equal to the second effective time, step 1266 uses the revision to the bit rate allocation chart or portion thereof to configure one or more components of the broadcast system.

It should be noted that communicating between the BMS and various broadcast components may comprise many methods including XML, HTTP, TCP/IP or other format or style.

Figure 21:
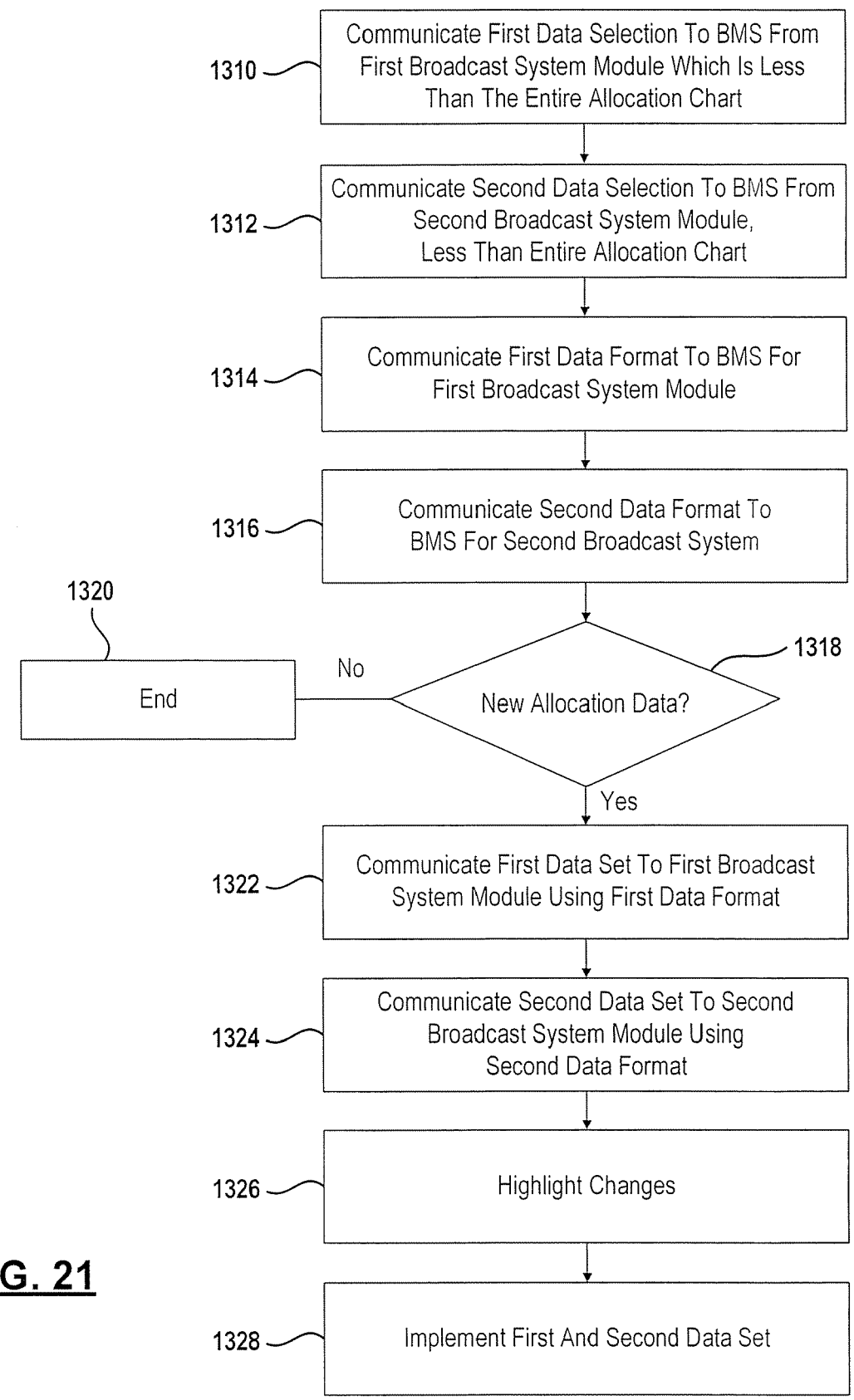
FIG. 21 is a flowchart of a method for communicating broadcast system data to components of the broadcast system.

Referring now to FIG. 21, a method for communicating with a traffic and scheduling system is illustrated. In step 1310, a first data selection is communicated to the BMS from the first broadcast system module which is less than the entire allocation chart. Various components may require different information. In step 1310, a first data selection is communicated to the BMS from the broadcast system module which is less than the entire allocation chart. The request for the first data selection may encompass various amounts of data from the BMS system. In step 1312, a second data selection may be provided to the BMS from a second broadcast system module that is less than the entire allocation chart. The second data selection may be different than the first data selection in step 1310. In step 1314, a first data format is communicated to the BMS for the first broadcast system module. In step 1316, a second data format is communicated to the BMS for the second broadcast system. The first broadcast system module and the second broadcast system module may require data in different formats. For example, data in comma-separated variable format, various charts, various requirements for rows and columns may all be used for communicating in a different format. It is likely that the formats for different systems may be different. The formats and the selections may be communicated from the components themselves or from an engineering department.

In step 1318, if there is no new allocation data, step 1320 is performed which ends the process. In step 1322, the first data set is communicated to the first broadcast system module using the first data format. In step 1324, the second data set is communicated to the second broadcast system module using the second data format. Communication may take place automatically upon approval or the like from the BMS system to the various broadcast system modules. In step 1326, when the data is communicated, changes may be highlighted to the operators of the various systems.

In step 1328, the first and second data sets may be implemented upon the effective data of the revision, change or new bit rate allocation data. The respective broadcast system components are then operated with the respective data sets and ultimately form uplink signals.

Figure 22:
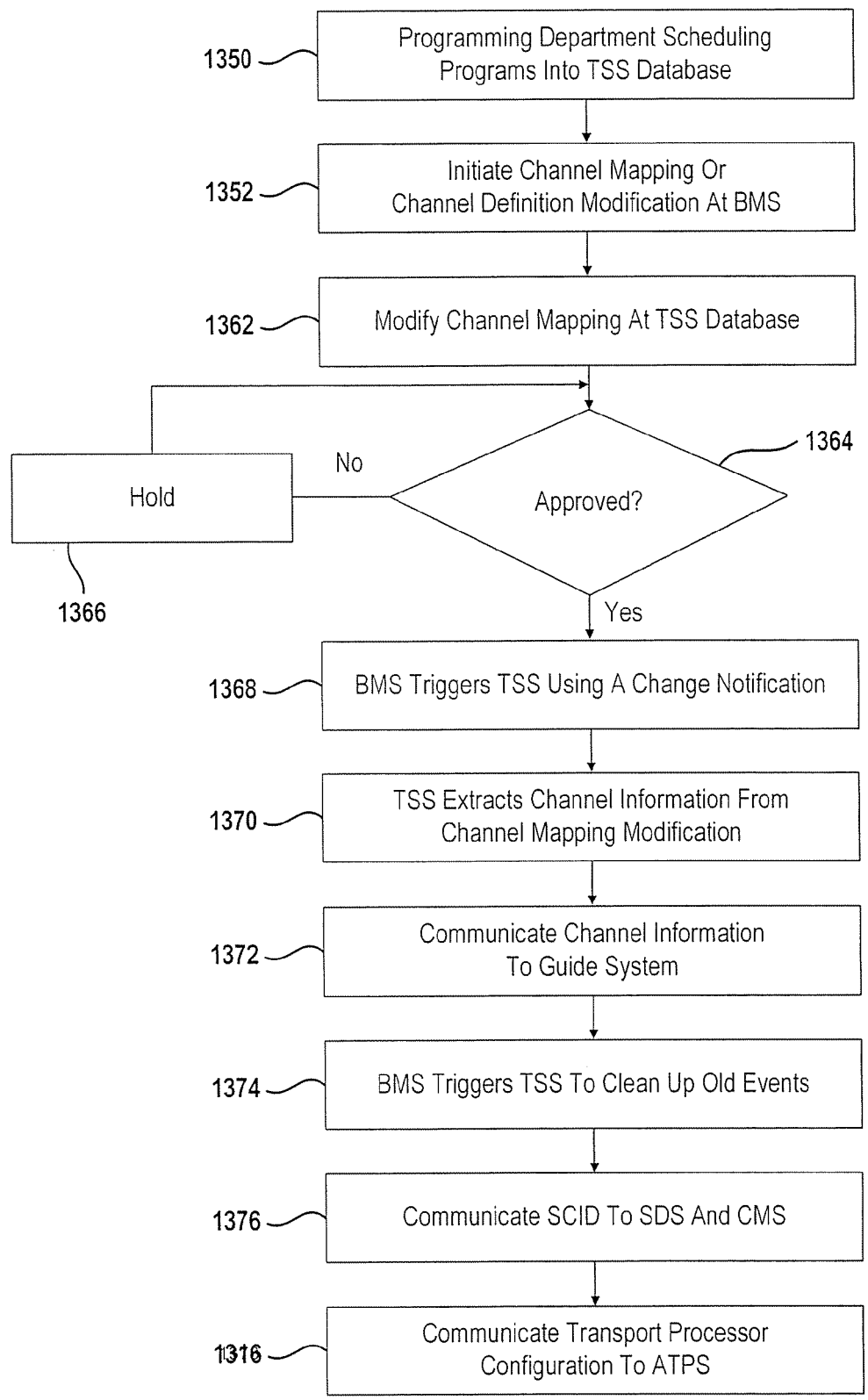
FIG. 22 is a flowchart of a method for communicating between a traffic and scheduling system and a broadcast operation channel management system.

Referring now to FIG. 22, a method for communicating between the broadcast operation channel management system and the traffic and scheduling system is set forth in further detail. In step 1350, the programming department schedules program into the traffic and scheduling system database. In step 1352, a channel mapping or channel definition modification may be initiated at the BMS. In step 1362, the channel mapping is modified at the traffic and scheduling database. In step 1364, if the modification has not been approved, step 1366 provides a hold and step 1364 is again performed until approved.

In step 1364, if the modification has been approved, the BMS triggers the traffic and scheduling system using a change notification in response to the approval of the change.

In step 1370, the traffic and scheduling system extracts channel information from the channel mapping modification. In step 1372, the channel information from step 1370 is communicated to the guide system. In step 1374, housekeeping may be performed by the BMS triggering the traffic and scheduling system to clean up any old events.

In step 1376, the service channel identifier may be communicated to the software download system and the content management system. The SCID information may also include channel identifiers, numbers, names and type. The broadcast operation channel configurations, including the uplink site, the uplink and downlink network and the uplink and downlink transponders as well as the packet identifiers and data rate may also be communicated.

In step 1378, the transport processing system may also receive the updated information. This may include various input and output transport rates, video stream type identifiers, channel definitions, buffer group definitions and network configurations.

Figure 23:
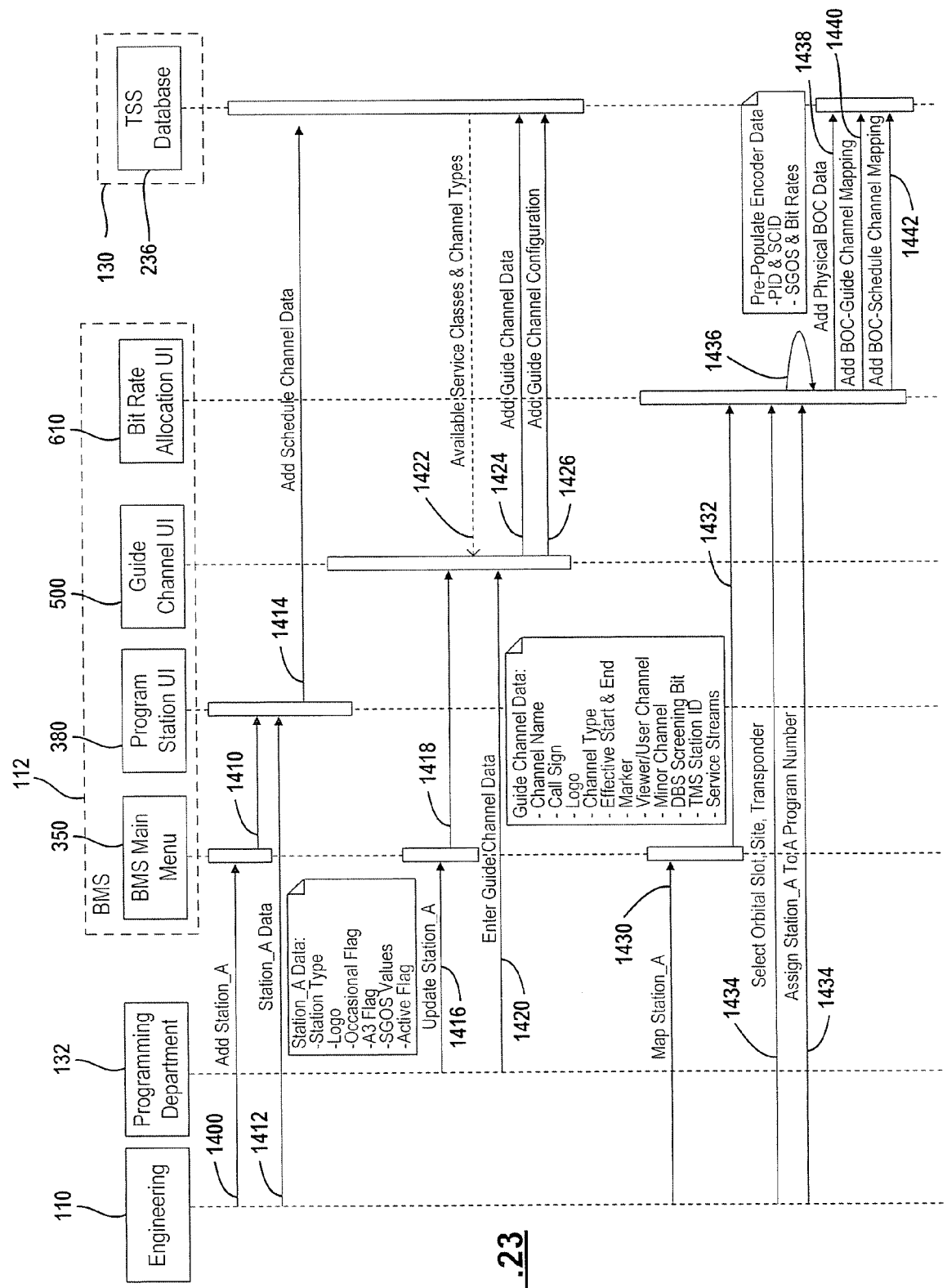
FIG. 23 is a flowchart of a method for adding a station to the broadcast system.

Referring now to FIG. 23, a method for adding a new station that highlights the communication between the BMS and the traffic and scheduling system is illustrated. In this example, the engineering department 110 provides input to the BMS 112 that adding a new station A is desired in step 1400 through the main menu 350 of the BMS. The main menu then changes to the program station user interface 380 in step 1410. In step 1412, station A data is input into the program station user interface 380 of FIG. 7. From the BMS, the schedule channel data from the data input in step 1412 is communicated to the traffic and scheduling system 130 database 236 in step 1414.

The station data for station A may comprise various station types, logos, an occasional flag, an A3 flag, a standard grade of service value and an active flag. Of course, the data may not be limited thereto.

The programming department 132 may also provide updates to station A in step 1416. From the main menu, a selection of an update is chosen. The guide channel user interface 500 of FIG. 9 may be entered from the main menu 350 in step 1418. In step 1420, the guide channel data may be input from the programming department. At the same time, available service classes and channel types may be communicated from the traffic and scheduling system database 236 in step 1422. In step 1424, guide data is added to the guide data user interface 500 then communicated to the traffic and scheduling system's database 236. In step 1426, a guide channel configuration may also be added to the traffic and scheduling system database 236. The guide channel data may include various information and may include a channel name, a call sign, a logo, a channel type, an effective start date and end date and time, a marker, a viewer/user channel, a minor channel, a data broadcasting system screening bit, a tribune media services station identifier and a service stream. The new station A may also be mapped for bit rate allocation. The engineering department 110 may be responsible for mapping station A. In step 1430, the engineering department communicates a desire to map station A from the main menu 350. The main menu then changes to the bit rate allocation user interface 610 illustrated in FIG. 11 in step 1432. Step 1434 selects an orbital slot site and transponder and inputs the data to the bit rate allocation user interface 610. Step 1434 assigns station A to a program number.

In step 1436, the bit rate allocation information may also be pre-populated with encoder data such as the packet identifiers, the service channel identifier, the standard grade of service and bit rates. In step 1438, the physical broadcast operation channel data may be provided to the traffic and scheduling system database 236. In step 1440, the broadcast operation channel guide channel mapping may also be stored within the traffic and scheduling database 236. In step 1442, the broadcast operation schedule channel mapping may also be stored within the traffic and scheduling database 236.

Figure 24:
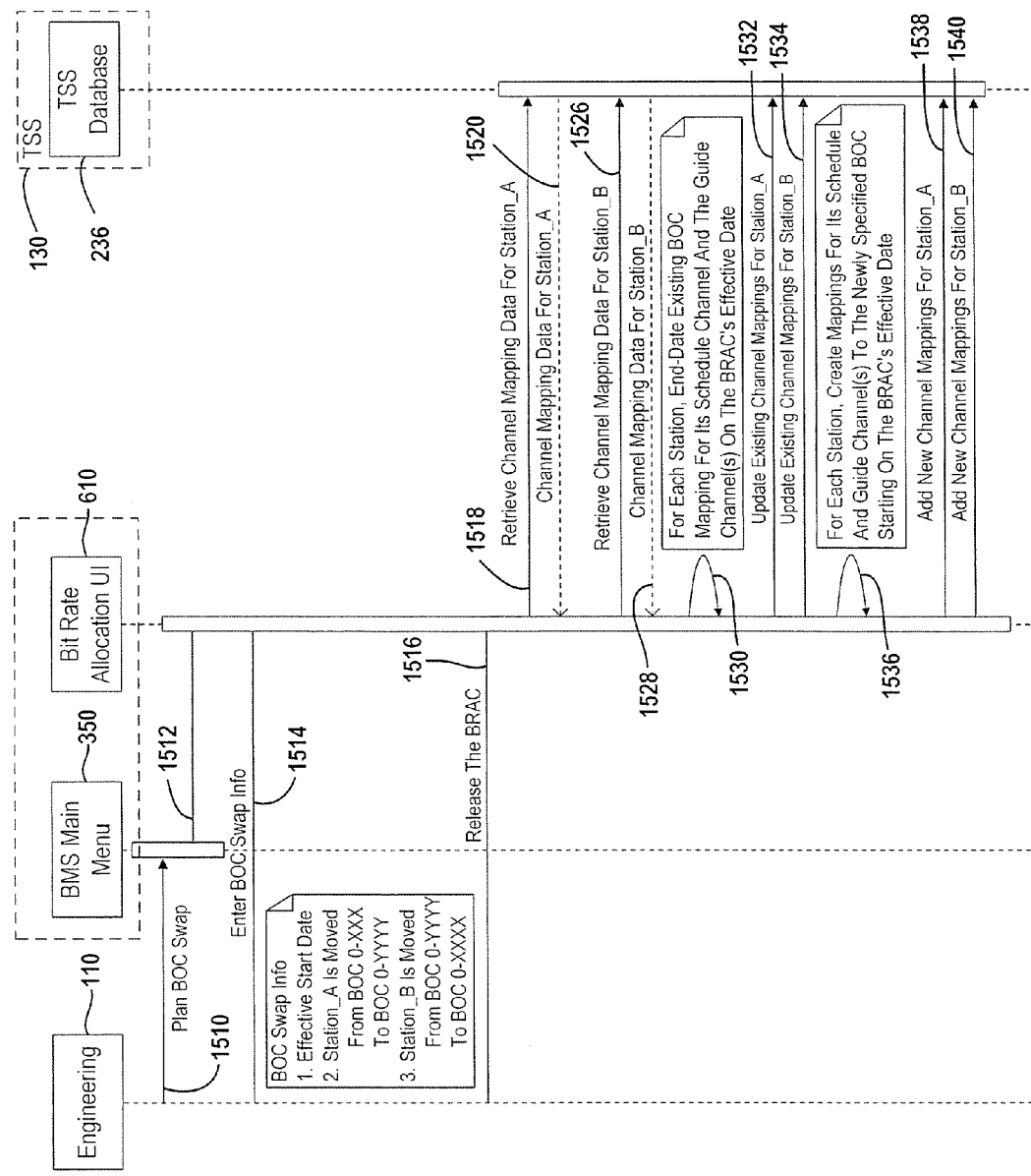
FIG. 24 is a method for swapping a program station.

Referring now to FIG. 24, a broadcast operation channel swap may easily be performed with the BMS system. In step 1510, engineering requests a swap from the BMS main menu 350. In step 1512, the bit rate allocation user interface 610 illustrated in FIG. 11 may be provided. In step 1514, BOC swap information may be entered. For example, an effective start date and at station A is moved from a particular BOC location to a second BOC location and that station B is moved from the second BOC location to a second BOC location is entered. In step 1516, the bit rate allocation chart may be released with the changes. The release bit rate allocation chart may be an approved chart. Upon approval, step 1518 communicates the bit rate allocation information entered into the user interface 610 to the traffic and scheduling system database. The database 236 retrieves channel mapping data for station A in step 1520. In step 1526, channel mapping is retrieved for station B or a request for channel mapping or retrieval of channel mapping is requested in step 1526. In step 1528, channel-mapping data may be retrieved from the traffic and scheduling system and communicated to the bit rate allocation user interface. The end date for each of the station A and station B channel mapping is set to the new bit rate allocation chart effective date. Thus, the channel mappings for station A and station B will be terminated at least in terms of time/date in step 1530. In step 1532, the channel mapping for station A is updated. In step 1534, the existing channel mapping for station B is updated. Step 1536 changes the new channel mappings to be effective on the bit rate allocation chart effective date.

In step 1538, the new channel mapping for station A is communicated to the traffic and scheduling system database 236. In step 1540, the new channel mapping for station B is transmitted to the traffic and scheduling system database 236.

Figure 25:
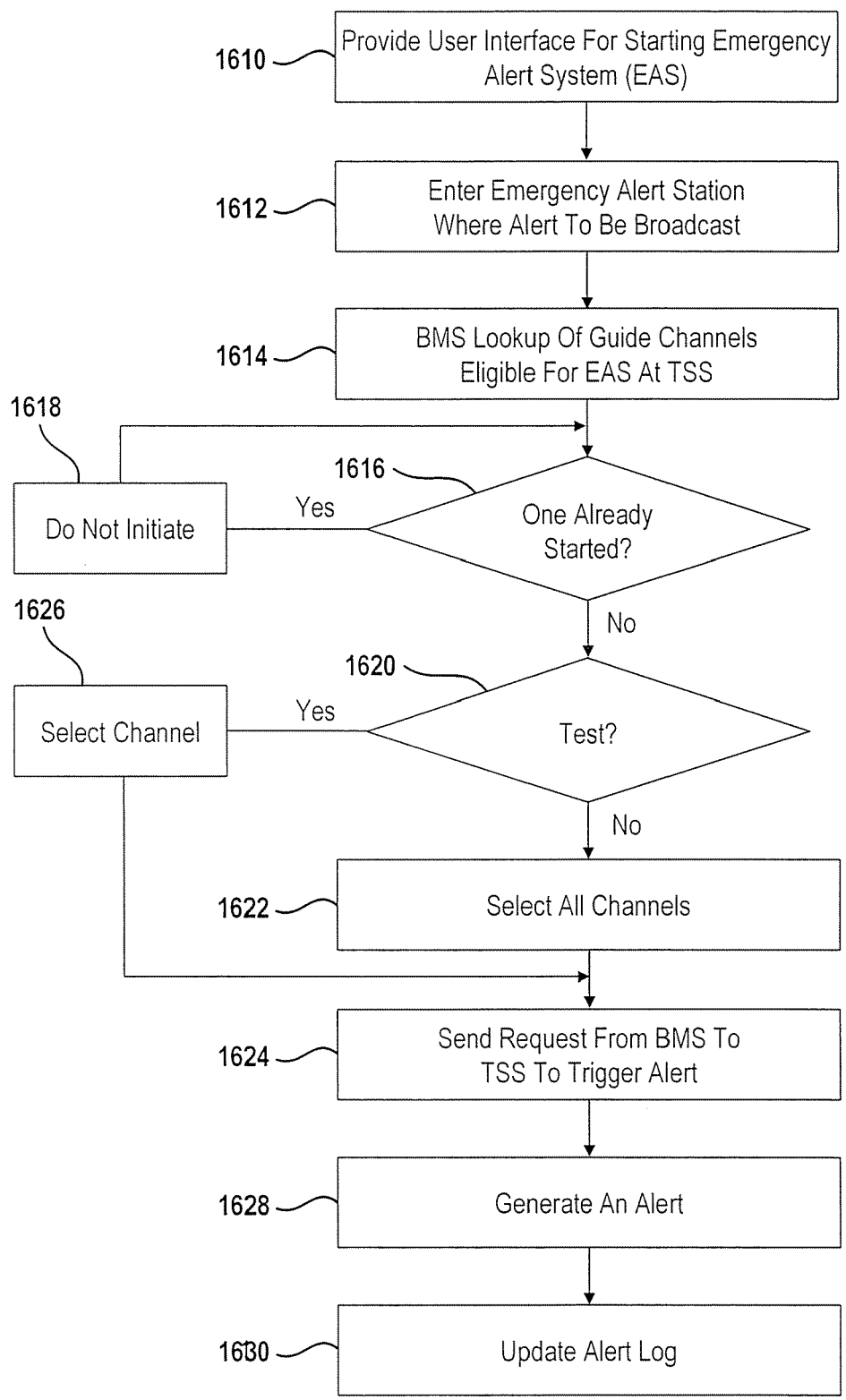
FIG. 25 is a flowchart of a method for triggering an emergency alert using the broadcast system.

Referring now to FIG. 25, a method for initiating an emergency alert is set forth. FIGS. 18A and 18B correspond to this process. In step 1610, a user interface may be provided in the BMS for starting an emergency alert. The emergency alert system (EAS) may be initiated in an actual emergency or in a testing mode. In step 1612, the emergency alert station where an alert is to be broadcast may be entered. In step 1614, the BMS may look up guide channels eligible for the emergency alert system at the traffic and scheduling system database. In this example, only one emergency alert may be provided at a single time. Thus, in step 1616, if an emergency alert has already been started, step 1618 does not initiate a new emergency alert. In step 1616, if an emergency alert has not been started, step 1620 is performed. In step 1620, it is determined whether or not a test is being run. This may be entered into a user interface. If a test is not run, all channels may be selected in step 1622. In step 1624, a request from the BMS to the traffic and scheduling system to trigger the alert is performed.

Referring back to step 1620, if the event is a test, step 1626 is performed in which one or several channels may be selected for performing the test. After step 1626, step 1624 is performed.

After sending the request from the BMS to the traffic and scheduling system to trigger an alert, an alert is generated from the traffic and scheduling system in step 1628. A log may be kept of the emergency alerts. In step 1630, the alert log is updated.

Figure 26:
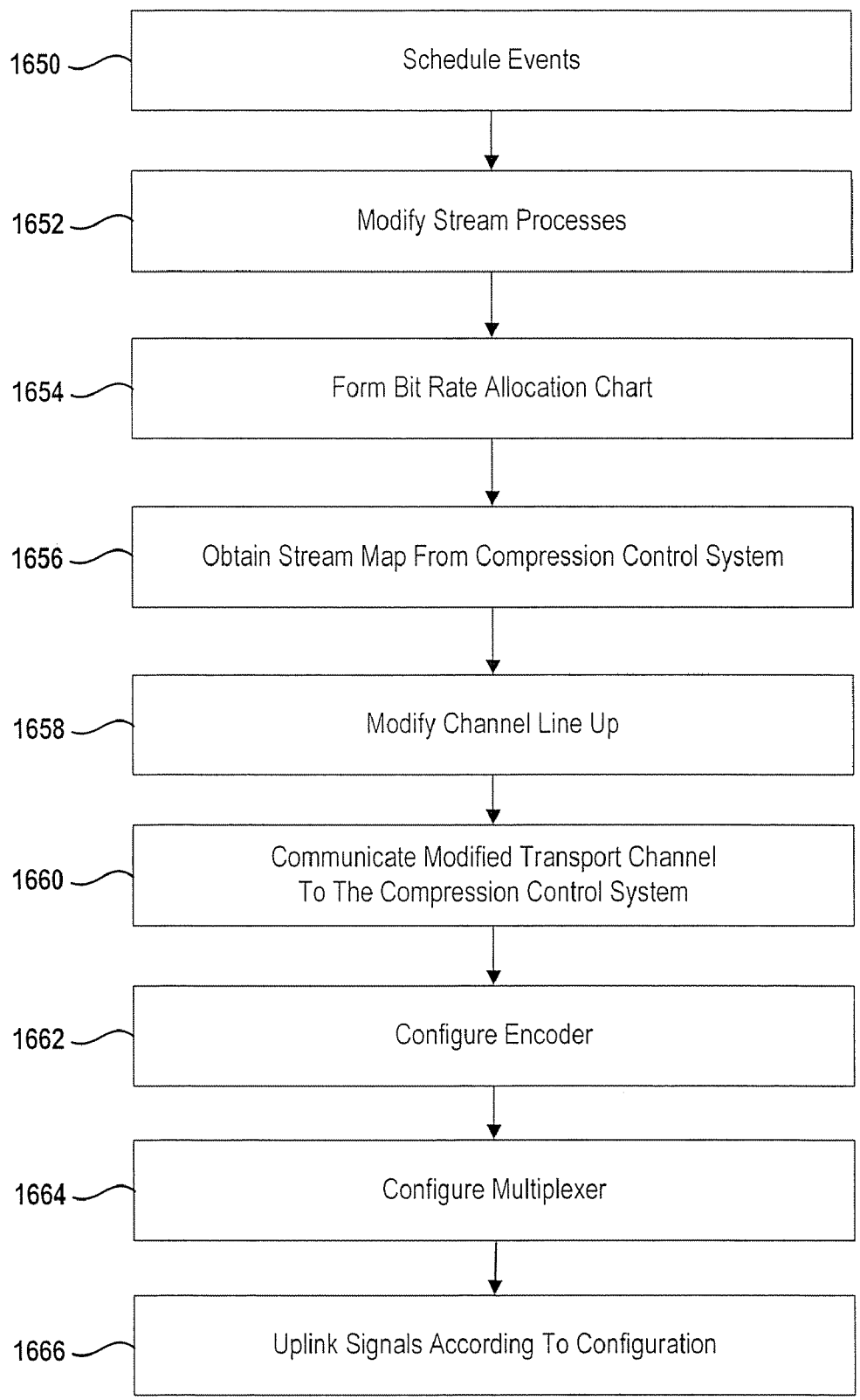
FIG. 26 is a flowchart of a method for communicating between the compression control system and the broadcast operation channel management system.

Referring now to FIG. 26, a method for communicating between the compression control system and the BMS is illustrated. In step 1650, various events are scheduled by the programming department. In step 1652, various channel stream processes may be modified. In step 1654, a bit rate allocation chart is formed from the modification of the channel stream processes. The modification of the stream processes may include modification of the stream map which includes the channel line-up of the output transport. The stream map may be obtained by the BMS system from the compression control system in step 1656.

In step 1658, the channel line-up may be modified. In step 1660, the modified transport channel may be communicated to the compression control system. In step 1662, the encoder may be configured by communicating the modified channel line-up from the compression control system. In step 1664, the multiplexing and splicing system 166 of FIG. 2 may be configured according to the modified transport channel stream. The multiplexer may be configured directly from the compression control system. After step 1664, uplink signals may be generated at the uplink RF system 172 of FIG. 2 in response to the various configurations.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   forming a bit rate allocation chart at a broadcast operation channel management system (BMS);
   storing a stream map having a channel line-up in a compression control system, said channel line-up comprising input channel data, output transport data and a bit rate group identifier;
   retrieving the channel line-up from the compression control system at the broadcast operation channel management system;
   modifying the channel line-up at BMS to form a modified channel line-up based on the bit rate allocation chart; and
   communicating the modified channel line-up from the BMS to the compression control system.

2. A method as recited in claim 1 wherein the input channel data comprises a service identifier, a video standard value, and an audio bit rate.

3. A method as recited in claim 1 wherein the output transport data comprises an orbital slot identifier, a transponder number and a service identifier.

4. A method as recited in claim 1 wherein the output transport data comprises a group bit rate.

5. A method as recited in claim 1 further comprising configuring a multiplexer in response to the modified channel line-up.

6. A method as recited in claim 1 further comprising configuring an encoder in response to the modified channel line-up.

7. A method as recited in claim 1 further comprising uplinking a transport stream signal to the satellite using the encoder and multiplexer.

8. A method as recited in claim 1 wherein communicating the modified channel line-up from the BMS to the compression control system comprises communication using XML.

9. A system comprising:
   a broadcast operation channel management system (BMS) forming a bit rate allocation chart;
   a compression control system storing a stream map having a channel line-up, said channel line-up comprising input channel data, output transport data and a bit rate group identifier;

said BMS retrieving the channel line-up from the compression control system and modifying the channel line-up to form a modified channel line-up based on the bit rate allocation chart; and said BMS communicating the modified channel line-up to the compression control system.

10. A system as recited in claim 9 wherein the input channel data comprises a service identifier, a video standard value, and an audio bit rate.

11. A system as recited in claim 9 wherein the output transport data comprises an orbital slot identifier, a transponder number and a service identifier.

12. A system as recited in claim 9 wherein the output transport data comprises a variable bit rate pool identifier and a pool bit rate.

13. A system as recited in claim 9 wherein said compression control system configures a multiplexer in response to the modified channel line-up.

14. A system as recited in claim 9 wherein said compression control system configures an encoder in response to the modified channel line-up.

15. A system as recited in claim 9 further a satellite comprising uplinking a transport stream signal to the satellite through an encoder and a multiplexer configured according to the modified channel line-up.

* * * * *